United States Patent
Pratt et al.

(10) Patent No.: US 10,892,786 B1
(45) Date of Patent: Jan. 12, 2021

(54) DIGITAL PREDISTORTION WITH OUT-OF-BAND AND PEAK EXPANSION REGULARIZATION

(71) Applicant: Analog Devices International Unlimited Company, Limerick (IE)

(72) Inventors: Patrick Pratt, Mallow (IE); David Jennings, Bristol (GB)

(73) Assignee: ANALOG DEVICES INTERNATIONAL UNLIMITED COMPANY, Limerick (IE)

( * ) Notice: Subject to any disclaimer, the term of this patent is extended or adjusted under 35 U.S.C. 154(b) by 0 days.

(21) Appl. No.: 16/656,036

(22) Filed: Oct. 17, 2019

(51) Int. Cl.
    *H04B 1/04* (2006.01)

(52) U.S. Cl.
    CPC ....... *H04B 1/04* (2013.01); *H04B 2001/0425* (2013.01)

(58) Field of Classification Search
    CPC .......................................... H04B 1/04
    USPC .......................................... 375/297
    See application file for complete search history.

(56) References Cited

U.S. PATENT DOCUMENTS

| | | | |
|---|---|---|---|
| 7,013,161 B2 | 3/2006 | Morris | |
| 7,634,024 B2 | 12/2009 | Tan | |
| 8,446,979 B1 | 5/2013 | Yee | |
| 8,928,404 B2 | 1/2015 | Khanifar et al. | |
| 9,191,041 B2 | 11/2015 | Mkadem et al. | |
| 9,337,782 B1* | 5/2016 | Mauer | H04B 1/0475 |
| 9,628,120 B2 | 4/2017 | Yu et al. | |
| 9,762,350 B2 | 9/2017 | Stopler et al. | |
| 1,009,714 A1 | 10/2018 | Almog et al. | |
| 1,022,497 A1 | 3/2019 | Pratt | |
| 10,581,469 B1* | 3/2020 | O'Shea | G06N 3/084 |
| 2004/0017859 A1* | 1/2004 | Sills | H04L 27/368 375/296 |
| 2004/0179629 A1* | 9/2004 | Song | H04L 27/368 375/296 |
| 2013/0226489 A1* | 8/2013 | Sogl | G01R 29/26 702/69 |

(Continued)

FOREIGN PATENT DOCUMENTS

WO 2019/014422 1/2019

OTHER PUBLICATIONS

Yu et al., *Band-Limited Volterra Series-Based Digital Predistortion for Wideband RF Power Amplifiers*, IEEE Transactions on Microwave Theory and Techniques, vol. 60, No. 12, Dec. 2012, 11 pages.

*Primary Examiner* — Lihong Yu
(74) *Attorney, Agent, or Firm* — Patent Capital Group

(57) ABSTRACT

An apparatus that implements DPD in a manner that can address OOB instability issues, PE instability issues, or both, is disclosed. The apparatus includes an actuator circuit configured to use a model of a power amplifier (PA) to apply a predistortion to at least a portion of an input signal, and an error correction circuit configured to generate an error signal indicative of a deviation of the output of the actuator circuit from the target output, e.g., in terms of OOB or PE. The apparatus also includes an adaptation circuit configured to update the model based on the error signal. By using such an error in adapting the model used for the DPD, undesirable effects of performing DPD, such as creation or amplification of OOB frequency components, or increasing amplitude of some samples, may be reduced or eliminated.

20 Claims, 9 Drawing Sheets

(56) References Cited

U.S. PATENT DOCUMENTS

2015/0004923 A1    1/2015  Beaudin
2017/0047954 A1*  2/2017  Tian ..................... H04B 1/0475
2019/0104278 A1*  4/2019  Ermilios ................. G06T 7/223

* cited by examiner

DIGITAL PREDISTORTION WITH OUT-OF-BAND AND PEAK EXPANSION REGULARIZATION

TECHNICAL FIELD OF THE DISCLOSURE

The present disclosure generally relates to electronics, and, more specifically, to predistorting input to circuits with nonlinear responses.

BACKGROUND

Both, systems used for wireless communication such as Long Term Evolution (LTE) and $5^{th}$ generation (5G), and systems used for cable communication such as cable television networks, are radio systems in that they transmit and receive signals in the form of electromagnetic waves in the radio frequency (RF) range of approximately 3 kiloHertz (kHz) to 300 gigaHertz (GHz). In both of these types of systems a power amplifier that is used to amplify RF signals prior to transmission is a crucial component.

Power amplifiers can generate amplified RF signals that include nonlinear distortions. The response of power amplifiers with nonlinear distortions can result in reduced modulation accuracy (e.g., reduced error vector magnitude (EVM)) and/or out-of-band emissions. Accordingly, communication systems have stringent specifications on power amplifier linearity.

Digital predistortion (DPD) can be applied to enhance linearity of a power amplifier. Typically, DPD involves applying, in the digital domain, predistortion to an input signal to be provided as an input to a power amplifier to reduce and/or cancel distortion that is expected to be caused by the power amplifier. The predistortion can be characterized by a power amplifier model. The power amplifier model can be updated based on the feedback from the power amplifier (i.e., based on the output of the power amplifier). The more accurate a power amplifier model is in terms of predicting the distortions that the power amplifier will introduce, the more effective the predistortion of an input to the power amplifier will be in terms of reducing the effects of the distortion caused by the amplifier.

Obtaining an accurate power amplifier model that may be used to perform DPD is not trivial and further improvements would be desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DESCRIPTION OF EXAMPLE EMBODIMENTS OF THE DISCLOSURE

Overview

Figure 1:
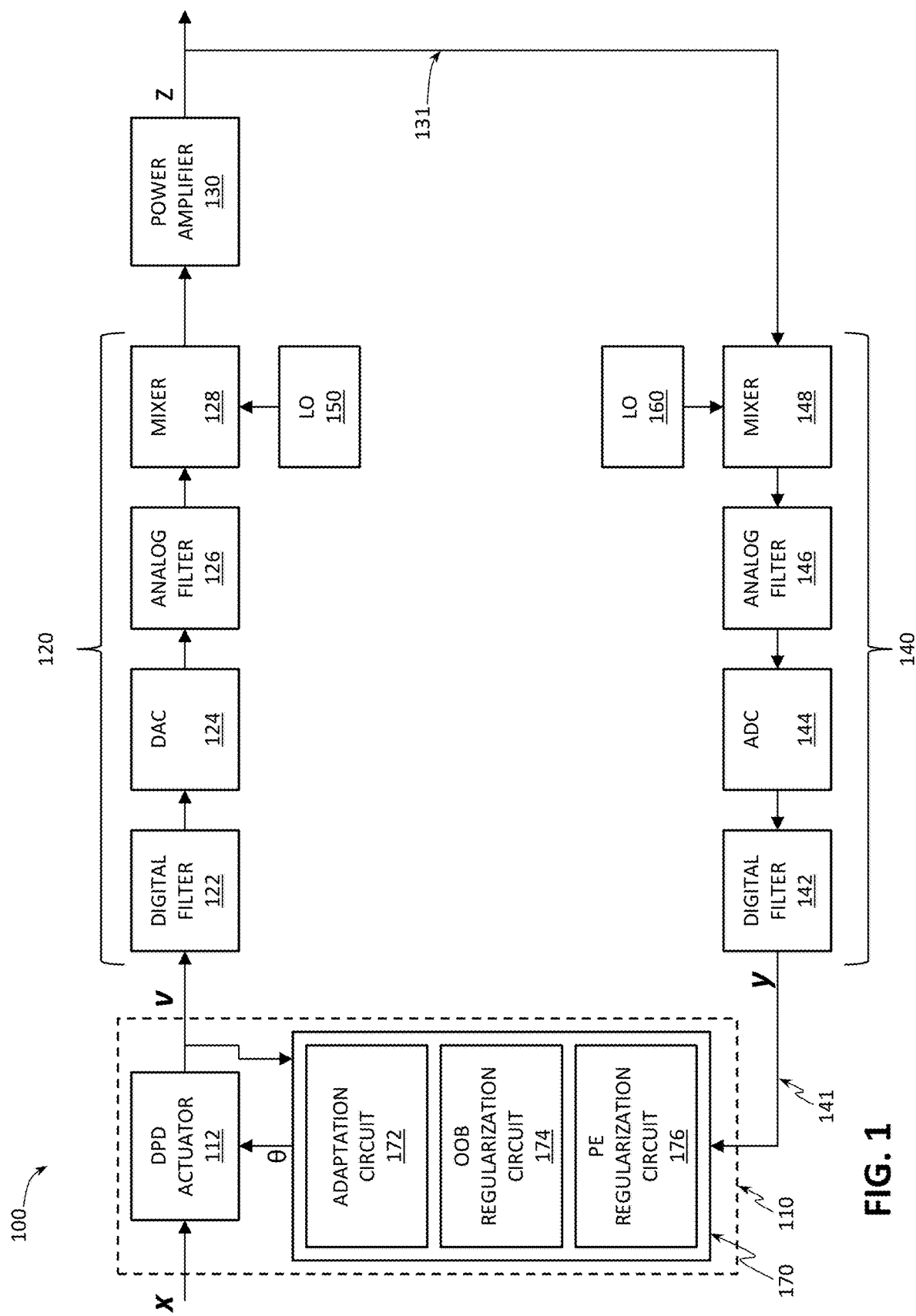
FIG. 1 illustrates a schematic block diagram of a communication system with a DPD circuit configured to implement OOB and/or PE regularization, according to some embodiments of the present disclosure.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating DPD techniques proposed herein, it might be useful to first understand phenomena that may come into play in communication systems. The following foundational information may be viewed as a basis from which the present disclosure may be properly explained. Such information is offered for purposes of explanation only and, accordingly, should not be construed in any way to limit the broad scope of the present disclosure and its potential applications.

As described above, DPD can pre-distort an input to a power amplifier to reduce and/or cancel distortion caused by the amplifier. To realize this functionality, at a high level, DPD involves forming a model of how a power amplifier may affect an input signal, the model defining coefficients of a filter to be applied to the input signal in an attempt to reduce and/or cancel distortions of the input signal caused by the amplifier. In this manner, DPD will try to compensate for the amplifier applying an undesirable nonlinear modification to the signal to be transmitted, by applying a corresponding modification to the input signal to be provided to the amplifier.

The model used in DPD algorithms is an adaptive model, meaning that it is formed in an iterative process by gradually adjusting the coefficients based on the comparison between the data that comes in to the input to the amplifier and the data that comes out from the output of the amplifier. Estimation of DPD coefficients is based on acquisition of finite sequences of input and output data (i.e., input to and output from a power amplifier), commonly referred to as "captures," and formation of a feedback loop in which the model is adapted based on the analysis of the captures. More specifically, DPD algorithms are based on forming a set of equations commonly referred to as "update equations," and searching for suitable solutions to the equations, in a broad solution space, to update the model of the power amplifier. To that end, DPD algorithms solve an inverse problem, which is the process of calculating, from a set of observations, the casual factors that produced these observations. Solving inverse problems in the presence of nonlinear effects is very challenging and may be ill-posed. In particular, inventors of the present disclosure realized that, under some conditions, such as limited loop bandwidth and limited peak power of a power amplifier, may be ill-posed by definition and possess no stable, workable solution in practice. If that happens, RF transmission of signals may be compromised not only because of power amplifiers distorting input signals provided thereto, but also because the DPD algorithms themselves create undesirable artefacts in signals to be transmitted. At best, such artefacts may negatively affect linearity of power amplifiers. At worst, they may render the amplifiers inoperable altogether.

One such artefacts is referred to in the present disclosure as "out-of-band (OOB) instability." An input signal to be amplified by a power amplifier typically includes frequency components in a certain target band, such frequency components referred to as "in-band components." However, if there is a band-limiting effect (e.g., if there is a filtering effect where the applied signal frequency content is modified, removed, or attenuated in some fashion) anywhere in a signal chain between a DPD actuator circuit and a power amplifier (e.g., a DAC reconstructing filter may be low pass in nature), conventional DPD algorithms often try to compensate for the effect by expanding the OOB frequency components in an input signal to be provided to the power amplifier. As a result, while an input signal provided to a DPD actuator circuit may, largely, only include the in-band frequency components, with no or very little energy in OOB components, an output of the DPD actuator circuit may have a non-negligible amount of energy in OOB frequency components, in addition to the in-band components. For example, the output of the DPD actuator circuit may have a bandwidth that is K times as wide as its' input bandwidth, where K is the highest order of the DPD correction used. The output of the DPD actuator circuit is eventually provided to the power amplifier, and an output of the power amplifier is provided, as a feedback signal, to the DPD adaptation circuit, which may be set on a wrong path of search for solutions because of the presence of the OOB components, resulting in unstable/unbounded behavior of the DPD in terms of creation of OOB components.

Another such artefact is referred to in the present disclosure as "peak expansion (PE) instability." Power amplifiers may have limited peak power capabilities, meaning that their gain may collapse at some high-power peaks. To compensate for that behavior, conventional DPD solutions may try to increase (i.e., expand) the peaks, which only makes the matters worse by also setting the DPD adaptation circuit on a wrong path in search of solutions and resulting in unstable/unbounded behavior of the DPD in terms of PE.

As the foregoing illustrates, conventional DPD algorithms leave room for improvement in terms of generating signals having OOB and/or PE instability issues.

One aspect of the present disclosure provides an apparatus that implements DPD in a manner that can address OOB instability issues, PE instability issues, or both. An example apparatus includes an actuator circuit configured to use a model of a nonlinear electronic component (e.g., a power amplifier) to apply a predistortion to at least a portion of an input signal to generate an output of the actuator circuit (i.e., to predistort the input signal prior to providing it to the power amplifier), and an error correction circuit configured to generate an error signal (e.g., $\varepsilon_{oob}$ or $\varepsilon_{peak}$, described herein) indicative of a deviation of the output of the actuator circuit from a target/desired output. For example, the error signal may be indicative of the OOB frequency components that may be present in the output of the actuator circuit, or the error signal may be indicative of peaks, in the output of the actuator circuit, having an amplitude beyond a certain threshold. The apparatus also includes an adaptation circuit configured to update the model based on one or more captures of a feedback signal indicative of (e.g., including, or being based on) an output of the power amplifier (where capture includes L consecutive samples of the feedback signal, where L is an integer equal to or greater than 2), and further based on the error signal. By using such an error in adapting a model used to perform DPD, undesirable effects of applying DPD, such as creation or amplification of OOB frequency components, or increasing amplitude of some samples, may be reduced or eliminated. Consequently, DPD may be more effective in reducing the distortions caused by the power amplifier, thereby advantageously improving its linearity.

Using an error signal indicative of OOB frequency components that may be present in the output of a DPD actuator circuit may reduce or eliminate the OOB instability of the DPD by diverting the DPD algorithm from the solutions that result in creation of OOB frequency components. Therefore, DPD that adapts a power amplifier model based on such an error signal is referred to herein as "DPD with OOB regularization" (since, in general, in mathematics and computer science, particularly in machine learning and inverse problems, "regularization" refers to the process of adding information in order to solve an ill-posed problem or to prevent overfitting). Similarly, using an error signal indicative of peaks, in the output of the actuator circuit, having an amplitude beyond a certain threshold may reduce or eliminate the PE instability of the DPD by diverting the DPD algorithm from the solutions that result in creation of such high-amplitude peaks. Therefore, DPD that adapts a power amplifier model based on such an error signal is referred to herein as "DPD with PE regularization."

While some of the descriptions are provided herein with reference to power amplifiers, in general, various embodiments of the methods of digital predistortion with OOB and/or PE regularization presented herein are applicable to any nonlinear electronic components (i.e., components that may exhibit nonlinear behavior) other than power amplifiers.

As will be appreciated by one skilled in the art, aspects of the present disclosure, in particular aspects of DPD with OOB and/or PE regularization as described herein, may be embodied in various manners—e.g. as a method, a system, a computer program product, or a computer-readable storage medium. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g., one or more microprocessors, of one or more computers. In various embodiments, different steps and portions of the steps of any methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing RF transmitters, receivers, and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference is made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The description may use the phrases "in an embodiment" or "in embodiments," which may each refer to one or more of the same or different embodiments. Unless otherwise specified, the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner. Various aspects of the illustrative embodiments are described using terms commonly employed by those skilled in the art to convey the substance of their work to others skilled in the art. The terms "substantially," "approximately," "about," etc., may be used to generally refer to being within +/−20% of a target value based on the context of a particular value as described herein or as known in the art. For the purposes of the present disclosure, the phrase "A and/or B" or notation "A/B" means (A), (B), or (A and B). For the purposes of the present disclosure, the phrase "A, B, and/or C" means (A), (B), (C), (A and B), (A and C), (B and C), or (A, B, and C). The term "between," when used with reference to measurement ranges, is inclusive of the ends of the measurement ranges. As used herein, the notation "A/B/C" means (A, B, and/or C).

Example Communication System with DPD with OOB and PE Regularization

As summarized above, some embodiments of the present disclosure relate to performing DPD with OOB and/or PE regularization. To that end, a system as shown in FIG. 1 may be used.

FIG. 1 illustrates a schematic block diagram of a communication system 100 with a DPD circuit 110 configured to implement OOB and/or PE regularization, according to some embodiments of the present disclosure. FIG. 1 illustrates that the communication system 100 may include a transmitter circuit (or, simply, a "transmitter") 120 in communication with the DPD circuit 110, and a power amplifier 130 in communication with the transmitter 120. At least a portion of the output from the power amplifier may be provided, as a feedback signal, to a receiver circuit (or, simply, a "receiver") 140 that is also in communication with the DPD circuit 110.

As shown in FIG. 1, the DPD circuit 110 may include a DPD actuator 112, configured to apply predistortion (or, more generally, modification) to an input signal provided to the DPD actuator. The DPD circuit 110 may also include a coefficient generator circuit 170 configured to generate coefficients to be used by the DPD actuator 112 to apply the predistortion. The coefficient generator circuit 170 may include an adaptation circuit 172, and one or both of an OOB regularization circuit 174 and a PE regularization circuit 176. The receiver 120 may include a digital filter 122, a digital-to-analog converter (DAC) 124, an analog filter 126, and a mixer 128. The transmitter 140 may include a digital filter 142, an analog-to-digital converter (ADC) 144, an analog filter 146, and a mixer 148. In various embodiments, the communications system 100 can include fewer or more elements than those illustrated in FIG. 1.

As shown in FIG. 1, an input signal x (which may be a sequence of digital samples and which may be a vector) may be received by the DPD actuator 112. In some embodiments, the input signal x may include one or more active channels in the frequency domain, but, for simplicity, an input signal with only one channel (i.e., a single frequency range of in-band frequencies) is described. In some embodiments, the input signal x may be a baseband digital signal. The DPD actuator 112 may be configured to predistort the input signal x based on predistortion coefficients provided by the coefficient generator circuit 170, thereby generating an output signal v, as shown in FIG. 1 (as used herein, lower case, bold italics single-letter labels used in the present figures, such as e.g., v, or x, shown in FIG. 1, refer to a vector). In turn, the coefficient generator circuit 170, e.g., the adaptation circuit 172 of the coefficient generator circuit 170, may be configured to generate the predistortion coefficients based on a model that uses an error signal indicative of OOB frequency components that may be present in the output of the DPD actuator 112 and/or an error signal indicative of peaks, in the output of the DPD actuator 112, having an amplitude beyond a certain threshold, described in greater detail below. The former error signal may be generated by the OOB regularization circuit 174 and may be referred to as an "OOB error signal," while the latter error signal may be generated by the PE regularization circuit 176 and may be referred to as a "PE error signal." The DPD actuator 112 can provide the predistorted input v (which may be a sequence of digital samples of the output signal from the DPD actuator 112), which is the input signal x to which predistortion has been applied, to the transmitter 120. The DPD actuator 112 can be implemented by any suitable circuits. For instance, in some embodiments, the DPD actuator 112 can be implemented by combinational logic circuits.

The transmitter 120 may be configured to upconvert the predistorted input v from a baseband signal to a higher frequency signal, such as an RF signal. In the illustrated transmitter 120, the predistorted input v may be filtered in the digital domain by the digital filter 122 to generate a filtered predistorted input, a digital signal. The output of the digital filter 122 may then be converted to an analog signal by the DAC 124. The analog signal provided by the DAC 124 may then be filtered by an analog filter 126. The output of the analog filter 126 may then be upconverted to RF by the mixer 128, which may receive a signal from a local oscillator 150 to translate the filtered analog signal from the analog filter 126 from baseband to RF. Other methods of implementing the transmitter 120 are also possible and within the scope of the present disclosure. For instance, in another implementation (not illustrated) the output of the digital filter 122 can be directly converted to an RF signal by the DAC 124. In such an implementation, the RF signal provided by the DAC 124 can then be filtered by the analog filter 126. Since the DAC 124 would directly synthesize the RF signal in this implementation, the mixer 128 and the local oscillator 150 illustrated in FIG. 1 can be omitted from the system 100 in such embodiments.

As further illustrated in FIG. 1, the RF signal generated by the transmitter 120 is provided to the power amplifier 130. The power amplifier 130 amplifies the RF signal and provides an amplified RF signal z (which may be a vector). The amplified RF signal z can be provided to an antenna (not illustrated in FIG. 1) to be wirelessly transmitted. The amplified RF signal z has a signal bandwidth. The signal bandwidth can be a wide bandwidth. As one non-limiting example, the signal bandwidth can be about 1 GHz. Ideally, the amplified RF signal z should just be an amplified version of the input signal x. However, as discussed above, the amplified RF signal z can have distortions outside of the main signal components. Such distortions can result from nonlinearities in the response of the power amplifier 130. As discussed above, it can be desirable to reduce such nonlinearities. Accordingly, feedback from the output of the power amplifier 130 can be provided to the DPD circuit 110 by way of the receiver 140. Then the DPD circuit 110 can cause the predistortion applied to the input signal x to be adjusted.

To provide feedback to the DPD circuit 110, a portion 131 of the amplified RF signal z can be provided to the receiver 140. For example, in some embodiments, a feedback element (not illustrated) may be used in the signal path between the output of the power amplifier 130 and the receiver 140, e.g., a resistive element that feeds back a relatively small portion of the amplified RF signal to the receiver 140. In some other embodiments (also not illustrated), a directional coupler or other suitable circuit can provide a portion of the amplified RF signal z to the receiver 140. In some embodiments (not illustrated), a feedback filter may be provided in the signal path between the output of the power amplifier 130 and the receiver 140, e.g., to filter the feedback signal 131 and provide the filtered signal as a feedback signal to the receiver 140 for processing. The feedback signal 131 provided to the receiver 140 can have approximately the same bandwidth as the amplified RF signal z.

In some embodiments, the receiver 140 is configured to perform diagnostics and/or equalization. Accordingly, the receiver 140 can be utilized for providing feedback to the DPD circuit 110 and for diagnostics and/or equalization in such embodiments. In the illustrated receiver 140, the feedback signal 131 may be downconverted to the baseband by the mixer 148, which may receive a signal from a local oscillator 160 (which may be the same or different from the local oscillator 150) to translate the feedback signal 131 from the RF to the baseband. The output of the mixer 148 may then be filtered by the analog filter 146. The output of the analog filter 146 may then be converted to a digital signal by the ADC 144. The digital signal generated by the ADC 124 may then be filtered in the digital domain by the digital filter 142 to generate a filtered downconverted feedback signal 141 which may be provided to the DPD circuit 110. FIG. 1 labels the feedback signal 141 provided to the DPD circuit 110 as a signal y (which may be a sequence of digital values indicative of the output z of the power amplifier 130, and which may also be modeled as a vector). Other methods of implementing the receiver 140 are also possible and within the scope of the present disclosure. For instance, in another implementation (not illustrated) the RF feedback signal 131 can be directly converted to a baseband signal by the ADC 144. In such an implementation, the downconverted signal provided by the ADC 144 can then be filtered by the digital filter 142. Since the ADC 144 would directly synthesize the baseband signal in this implementation, the mixer 148 and the local oscillator 160 illustrated in FIG. 1 can be omitted from the system 100 in such embodiments.

Further variations are possible to the system 100, described above. For example, while upconversion and downconversion is described with respect to the baseband frequency, in other embodiments of the system 100, an intermediate frequency (IF) may be used instead. IF may be used in superheterodyne radio receivers, in which a received RF signal is shifted to an IF, before the final detection of the information in the received signal is done. Conversion to an IF may be useful for several reasons. For example, when several stages of filters are used, they can all be set to a fixed frequency, which makes them easier to build and to tune. In some embodiments, the mixers of RF transmitter 120 or the receiver 140 may include several such stages of IF conversion. In another example, although a single path mixer is shown in each of the transmit (TX) path (i.e., the signal path for the signal to be processed by the transmitter 120) and the receive (RX) path (i.e., the signal path for the signal to be processed by the receiver 140) of FIG. 1, in some embodiments, the TX path mixer 128 and the RX path mixer 148 may be implemented as a quadrature upconverter and downconverter, respectively, in which case each of them would include a first mixer and a second mixer. For example, for the RX path mixer 148, the first RX path mixer may be configured for performing downconversion to generate an in-phase (I) downconverted RX signal by mixing the feedback signal 131 and an in-phase component of the local oscillator signal provided by the local oscillator 160. The second RX path mixer may be configured for performing downconversion to generate a quadrature (Q) downconverted RX signal by mixing the feedback signal 131 and a quadrature component of the local oscillator signal provided by the local oscillator 160 (the quadrature component is a component that is offset, in phase, from the in-phase component of the local oscillator signal by 80 degrees). The output of the first RX path mixer may be provided to a I-signal path, and the output of the second RX path mixer may be provided to a Q-signal path, which may be substantially 80 degrees out of phase with the I-signal path.

Functionality of the OOB regularization circuit 174 and the PE regularization circuit 176 will be described in the following sections. Again, in some embodiments, the DPD circuit 110 may include only the OOB regularization circuit 174 but not the PE regularization circuit 176; in other embodiments, the DPD circuit 110 may include only the PE regularization circuit 176 but not the OOB regularization circuit 174; and, still in other embodiments, DPD circuit 110 may include both the OOB regularization circuit 174 and the PE regularization circuit 176.

OOB Regularization

Turning to the details of the DPD circuit 110, functionality of performing DPD with OOB regularization according to various embodiments of the present disclosure may be illustrated with reference to FIGS. 2-6.

Figure 2:
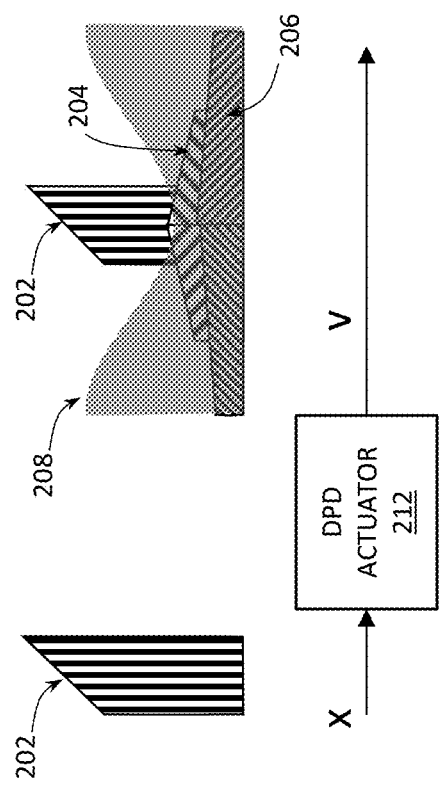
FIG. 2 provides an illustration of an OOB instability.

FIG. 2 provides an illustration of an OOB instability that may be created as a result of applying conventional DPD by a DPD actuator 212. As shown in FIG. 2, an input signal to the DPD actuator 212 may be a signal 202 having a certain band of frequency components, i.e., the in-band components. However, at the output of the DPD actuator may be a signal that contains not only the in-band components 202, but also third order nonlinear terms 204 and fifth order nonlinear terms 206. Furthermore, if there is a band-limiting effect anywhere in the signal path of the signal 202, conventional DPD will try to compensate by expanding the OOB components 208, resulting in unstable and/or unbounded solution.

Figure 3:
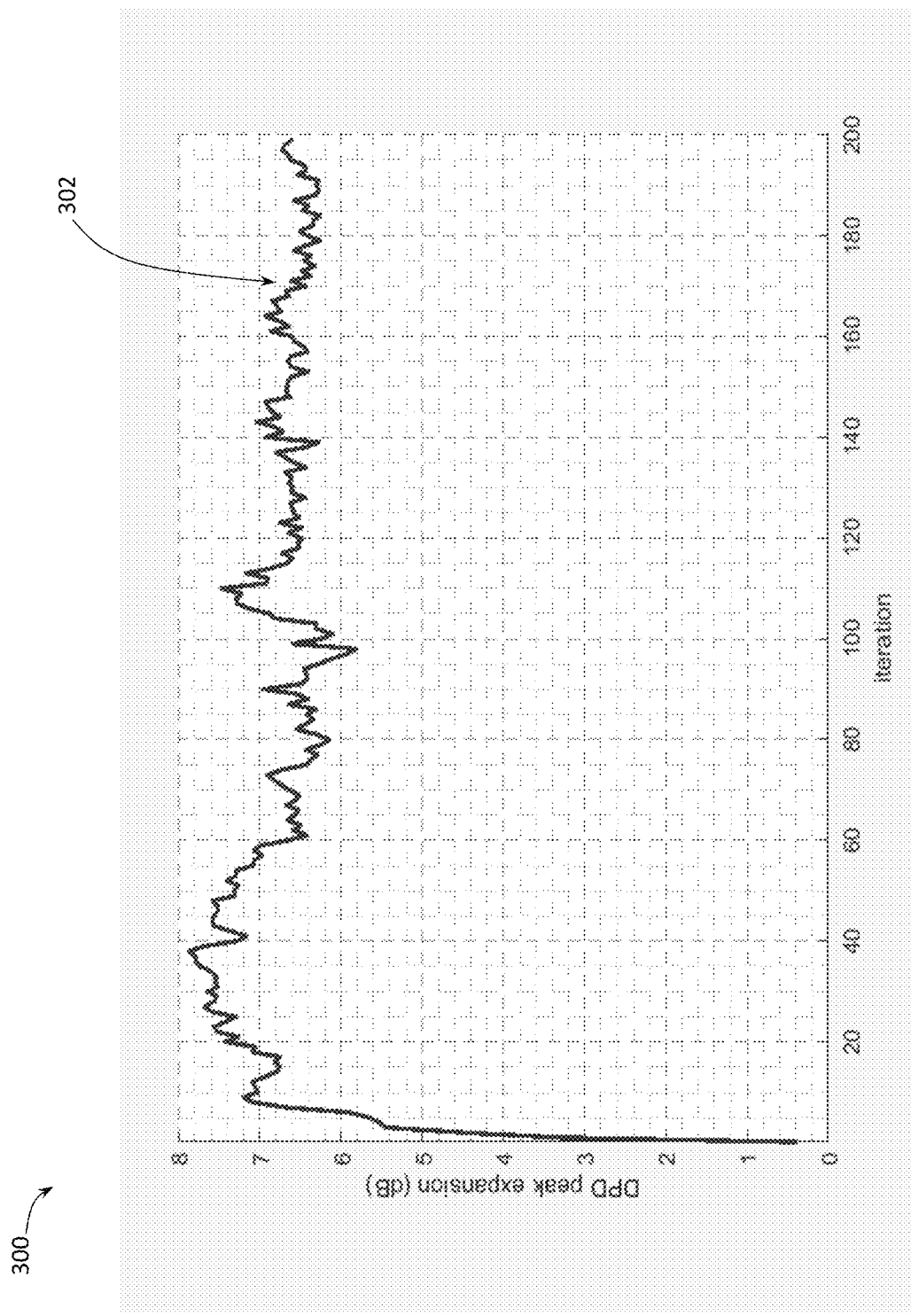
FIG. 3 illustrates an example result of an OOB instability.

FIG. 3 shows a graph 300 that illustrates an example result of an OOB instability. The horizontal axis of the graph 300 is used to measure the number of iterations of a DPD algorithm (i.e., the number of times the model coefficients are adapted). The vertical axis of the graph 300 is used to measure DPD peak expansion, which may be computed as a ratio of the peak at the output of a DPD actuator to the peak at the input to the DPD actuator. For example, the vertical axis of the graph 300 may be used to measure a ratio of the peak at the output signal v of the DPD actuator 212, which output signal includes components 202, 204, 206, and 208, as described above, to the peak at the input signal to the DPD actuator 212, which input signal includes substantially only the in-band components 202. A curve 302 shown in FIG. 3 illustrates that, at the beginning (e.g., the first few iterations), the peak expansion is about 0 dB, prior to any DPD training. However, as the system adapts, due to the band limiting effect, the DPD expands to values of 6-8 dB, over 2 and ½ times the input peak amplitude. All the individual blocks around the loop have a finite operating range and only a limited expansion can be supported in practice. If any of the blocks around the loop have insufficient headroom to support this level of expansion, then they will hard clip (e.g., saturate) and compound the distortion from the power amplifier (e.g., the DAC, the upconverter, pre-amp stages, etc., may begin to compress and then hard clip). With growing levels of compression, the DPD reacts with further expansion, and a positive feedback cycle of deepening compression followed by widening DPD expansion emerges, which can lead to the eventual and dramatic loss of performance.

Figure 4:
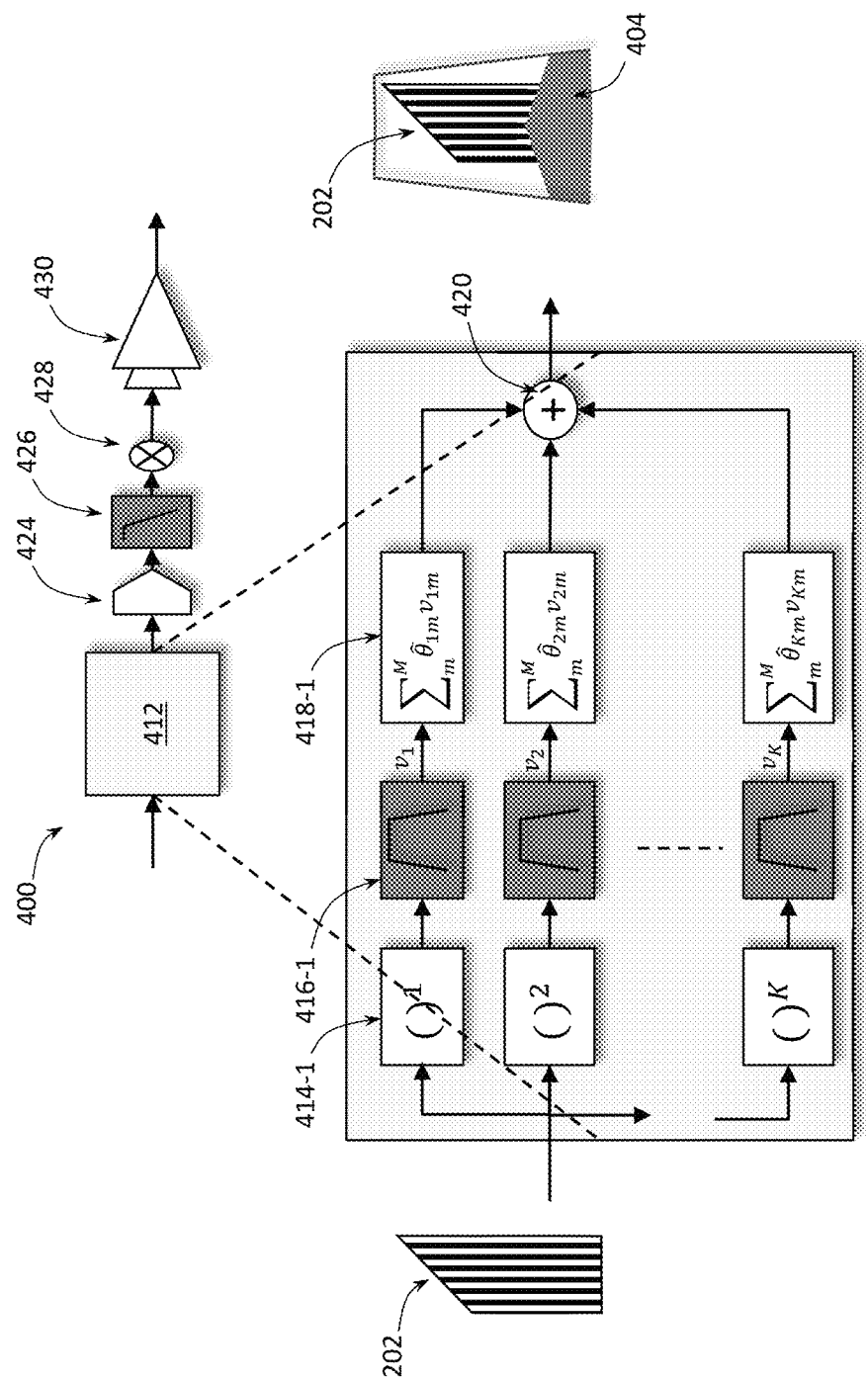
FIG. 4 illustrates a schematic block diagram of a portion of a communication system with a DPD circuit that attempts to limit DPD bandwidth expansion.

Some conventional DPD solutions have attempted to limit DPD bandwidth expansion, one of them shown in FIG. 4. FIG. 4 illustrates a schematic block diagram of a portion of a communication system 400 with a DPD circuit that attempts to limit DPD bandwidth expansion. In particular, FIG. 4 illustrates a DPD actuator 412 and some portions of the transmitter signal chain following the DPD actuator 412, such as a DAC 424, an analog filter 426, a mixer 428, and a power amplifier 430 (which could be analogous to the DAC 124, the analog filter 126, the mixer 128, and the power amplifier 130, described above). Details of the DPD actuator 412 are also shown in FIG. 4. An input signal, e.g., the input signal 202 as described above, may be provided to the DPD actuator 412 where it is processed by different DPD kernels 414 (K of which are shown in FIG. 4 but, in order to not clutter the drawing, only one of which is labeled in FIG. 4 with a reference numeral 414-1, indicating that it's a first instance of a DPD kernel 414). Each DPD kernel 414 is followed by a filter 416 (again, K of which are shown in FIG. 4 but, in order to not clutter the drawing, only one of which is labeled in FIG. 4 with a reference numeral 416-1, indicating that it's a first instance of a filter 416), which is typically an LPF, in order to filter out the OOB components which may be created by the respective DPD kernels 414. The DPD kernels 414-1 to 414-K are configured generate the memoryless terms; order 1 (linear), order 2, . . . up to order K. Each of these terms are expanded in bandwidth by their respective order (e.g., order K term is expanded by K times). They are followed by respective 416-1 to 416-K, which are filters that limit the bandwidth (e.g., to the lowest bandwidth around the loop). The filters 416 are followed by respective 418-1 to 418-K, which are adaptive filters whose coefficients $\hat{\theta}$ are trained during the DPD training. In the solution of FIGS. 4, 414 and 418 are components of a conventional DPD. The outputs of 418 are then added by an adder 420 to generate an output of the DPD actuator 412.

What is new in this solution is 416, which is added to solve the OOB instability problem. As shown with a schematic of a signal on the right side of FIG. 4, such implementation of the DPD actuator 412 may help reducing peak expansion in that components 404 added to the in-band signal 202 are smaller than those shown in the illustration of FIG. 2. However, implementing different band-limited kernels, in particular, implementing multiple instances of the filters 416 as additional hardware components, is very expensive, both in terms of cost and power consumption (i.e., the solution of FIG. 4 comes at a substantial cost as the solution now requires K additional filters costing gates and power). As such, the implementation shown in FIG. 4 is not an option for some implementations, such as cable communication systems.

Figure 5:
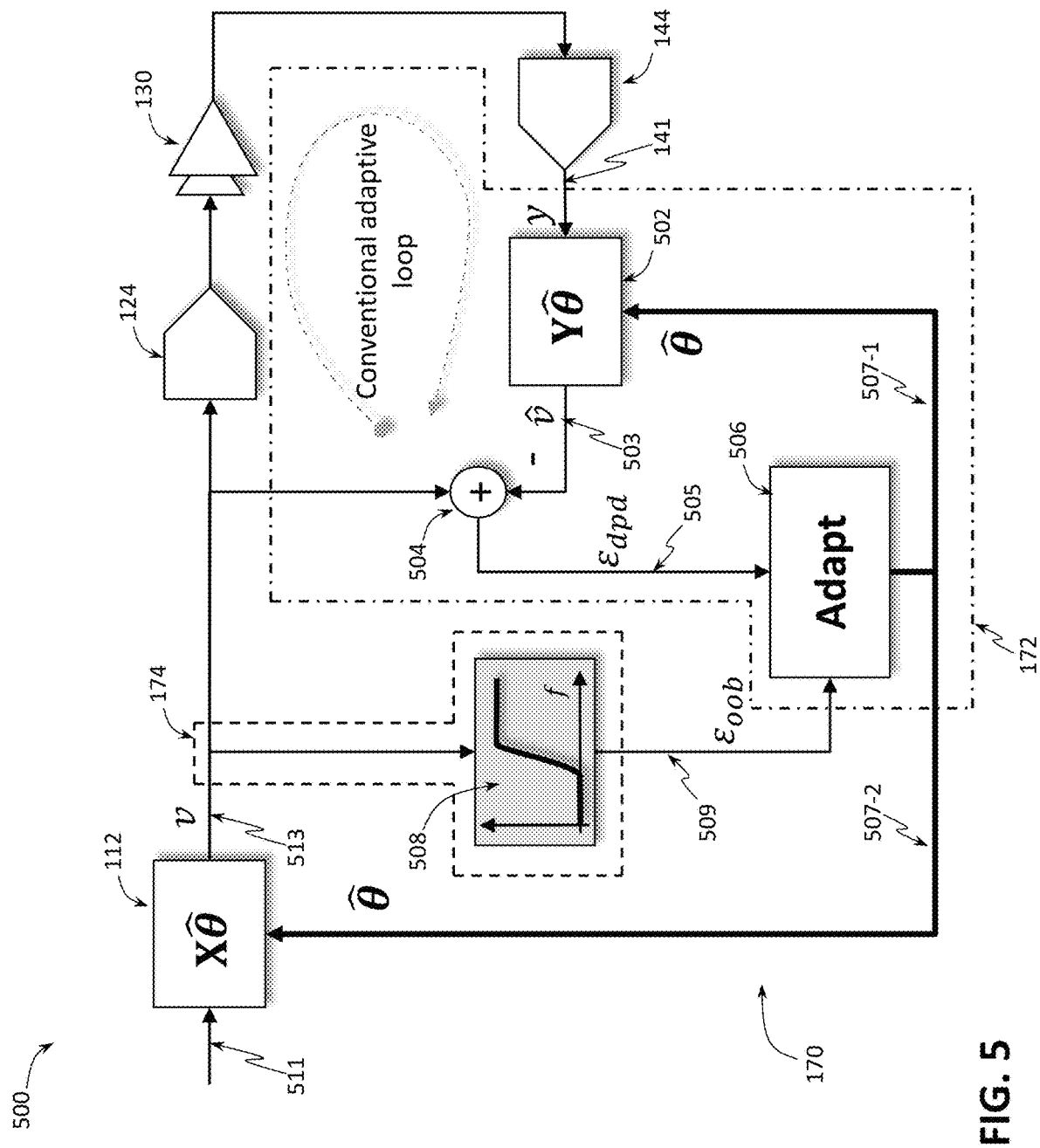
FIG. 5 illustrates a schematic block diagram of a portion of a communication system with a DPD circuit with OOB regularization, according to some embodiments of the present disclosure.

FIG. 5 illustrates a schematic block diagram of a portion 500 of the communication system 100 shown in FIG. 1, with a DPD circuit with OOB regularization, according to some embodiments of the present disclosure. FIG. 5 illustrates some elements with the same reference numerals as those used in FIG. 1 to indicate that these elements are the same or analogous as those described with reference to FIG. 1 so that, in the interests of brevity, their description is not repeated. In particular, FIG. 5 illustrates the DPD actuator 112, the DAC 124, the power amplifier 130, and the ADC 144. Other components of the transmitter 120 and the receiver 140 which were shown in FIG. 1 are not shown in FIG. 5 in order to not clutter the drawing because the illustration of FIG. 5 focuses on the example implementation of the adaptation circuit 172 (approximate functional boundaries of which are shown in FIG. 5 with a dash-dotted contour) and of the OOB regularization circuit 174 (approximate functional boundaries of which are shown in FIG. 5 with a dashed contour).

As shown in FIG. 5, the adaptation circuit 172 may include an adaptive postdistortion circuit 502, an adder/subtractor 504, and an adaptation circuit 506. As in conventional adaptive loops used to perform DPD, the feedback signal 141 (also labeled as a signal y in FIG. 5, as in FIG. 1) is received by the adaptive postdistortion circuit 502, which may then generate a postdistorted signal 503 by applying model coefficients $\hat{\theta}$ (a vector) to the feedback signal 141, and the postdistorted signal 503 is then provided to the adder/subtractor 504. The postdistorted signal 503 is labeled in FIG. 5 with a hat symbol ($\hat{v}$) to indicate that it's an approximation or an estimate of the output 513 of the DPD actuator circuit 112.

The adder/subtractor 504 is configured to also receive the output 513 (also labeled as a signal v in FIG. 5, as in FIG. 1) of the DPD actuator circuit 112. The output 513 is generated by the DPD actuator circuit 112 by applying model coefficients $\hat{\theta}$ to the input signal 511, shown in FIG. 5. The adder/subtractor 504 is configured to generate a DPD error signal 505 ($\varepsilon_{dpd}$, shown in FIG. 5) indicative of a difference between the output 513 of the actuator circuit 112 (i.e., a signal which may not only include the in-band frequency components but also the OOB frequency components) and the postdistorted feedback signal 503 indicative of the output of the power amplifier 130, as provided from the adaptive postdistortion circuit 502. The DPD error signal $\varepsilon_{dpd}$ is then provided to the adaptation circuit 506 which may update the model of the power amplifier 130 (i.e., update the coefficients to be applied by the DPD actuator 112 in a subsequent iteration) based on the DPD error signal 505 ($\varepsilon_{dpd}$) and provide updated coefficients $\hat{\theta}$ both to the adaptive postdistortion circuit 502, as shown in FIG. 5 with a communication path labeled as 507-1, and to the DPD actuator circuit 112, as shown in FIG. 5 with a communication path labeled as 507-2 (the hat symbols provided above the coefficients $\theta$ near the paths 507-1 and 507-2 indicate that the coefficients $\hat{\theta}$ are an estimate or an approximation).

Importantly, the adaptation circuit 506 is configured to update the model of the power amplifier 130 not only based on the DPD error signal 505 ($\varepsilon_{dpd}$) but also based on an OOB error signal 509 ($\varepsilon_{oob}$, also shown in FIG. 5). To that end, the OOB regularization circuit 174 may be implemented as shown in FIG. 5, where the OOB regularization circuit 174 may include a filter 508, configured to receive the output 513 of the actuator circuit 112 and to use the received output 513 to generate the OOB error signal 509 which is indicative of the OOB (i.e., undesired) frequency components that might be present in the output 513 of the actuator circuit 112. For example, in some embodiments, the filter 508 may be a high-pass filter configured to attenuate (e.g., reduce or eliminate) the in-band frequency components from the output 513 while substantially passing the OOB frequency components that may be present in the output 513. In some other embodiments, the filter 508 may attenuate (i.e., decrease in amplitude) or amplify (i.e., increase in amplitude) the OOB frequency components by a relatively small amount. For example, while it might be preferable in some embodiments to implement the filter 508 so that it would simply pass the OOB components to the output 509, without any attenuation or amplification to these components (i.e., the factor by which the amplitude of these components is adjusted is substantially 1.0), in some other embodiments the filter 508 may amplify the OOB components. For example, the factor by which the amplitude of these components is adjusted from the input to the filter 508 (i.e., the signal 513) to the output of the filter 508 (i.e., the signal 509) may be between about 1.0 and 2.0, including all values and ranges therein, e.g., between about 1.0 and 1.5, or between about 1.0. and 1.2. In other embodiments, the filter 508 may be attenuate the OOB components, e.g., with the factor by which the amplitude of these components is adjusted being between about 0.5 and 1.0, including all values and ranges therein, e.g., between about 0.7 and 1.0, or between about 0.9 and 1.0. If any attenuation is applied by the filter 508 to the OOB components, this would be very different to the attenuation factor applied by the filter 508 to attenuate the in-band components, where the attenuation factor for the in-band components may be between about 0 and 0.5, or between 0 and 0.2, so that the in-band components are attenuated more than the out-of-band components.

Other implementations of the OOB regularization circuit 174 may be used and are within the scope of the present disclosure as long as the OOB error signal 509 generated by the OOB regularization circuit 174 is such that the greater the OOB components in the output 513 of the DPD actuator circuit 112, the larger is the OOB error signal 509. The OOB error signal 509 may then be used by the adaptation circuit 506, in addition to the DPD error signal 505, to update the model and generate updated coefficients $\hat{\theta}$ to be provided to the adaptive postdistortion circuit 502 and to the DPD actuator circuit 112, to be used in subsequent iterations.

In some embodiments, the adaptation of the system 500 may function as follows. The model of the power amplifier 130 may include a loss term, or function, that is a multi-objective loss that includes a first term and a second term. The first term may be indicative of a difference between the feedback signal 141 and the output 513 of the DPD actuator circuit 112. The second term may be indicative of an amount and/or a magnitude of the OOB frequency components present in the output 513 of the actuator circuit 112, thus providing a measure of the DPD output 513 that falls out of band, such as the power or mean square value. For example, the first term may be indicative of (e.g., be based on) the DPD error signal 505, while the second term may be indicative of the OOB error signal 509. At least one of the first term and the second term may be a mean squared value. For example, the loss function may be a multi-objective loss function defined as:

$$\mathcal{L}(\varepsilon_{dpd}, \varepsilon_{oob}) = E\{\varepsilon_{dpd}\} + \lambda_{oob} E\{\varepsilon_{oob}^2\}, \quad (1)$$

where the first term, $E\{\varepsilon_{dpd}^2\}$, may be indicative of the Least Squares (OLS) DPD loss (where "ordinary" is understood as meaning no regularization is used), and may be based on the mean squared value of the DPD error signal 505 ($\varepsilon_{dpd}$), while the second term, $E\{\varepsilon_{oob}^2\}$, may be indicative of the OOB loss, and may be based on the mean squared value of the OOB error signal 509 ($\varepsilon_{oob}$). In this equation, parameter $\lambda_{oob}$ may be a weight that defined how heavily the OOB error signal is to be weighed in the loss function. In this way, by incorporating the second term into the loss function, the adaptation circuit 506 may be configured to penalize DPD solutions having OOB content, where the greater is the weight $\lambda_{oob}$, the heavier the penalty may be. The adaptation circuit 506 may then be configured to update the model based on the DPD error signal 505 and the OOB error signal 509 with the goal of decreasing the loss function.

In some embodiments, the adaptation circuit 506 updating the model based on the OOB error signal 509 to decrease the loss function may include the adaptation circuit implementing a Gauss-Newton algorithm to decrease the loss function, although, in other embodiments, other algorithms may be used.

In some embodiments, the coefficients may be updated according to the following update equation:

$$\hat{\theta}_k = \hat{\theta}_{k-1} + \mu \{Y^H Y + \lambda_{oob} U^H U\}^{-1} \{Y^H \varepsilon_{dpd} + \lambda_{oob} U^H \varepsilon_{oob}\}, \quad (2)$$

where Y is the negative gradient, (Jacobian) of $E\{\varepsilon_{dpd}^2\}$), U is the negative gradient, (Jacobian) of $E\{\varepsilon_{oob}^2\}$, $U = -X \oplus h_{oob}$, X DPD basis matrix whose column vectors are the DPD features, $h_{oob}$ is a band stop filter over the band of interest (e.g., stops in-band, passes OOB frequency components), and $X \oplus h_{oob}$ is the convolution of the column vectors of X with $h_{oob}$.

When DPD output 513 (i.e., v) contains only in-band content OOB error, $\varepsilon_{oob}$ and gradient u are both 0 and the DPD is unpenalized. Conversely, when the DPD actuator 112 produces OOB content, penalization and OOB regularization increases.

As the foregoing description illustrates, the adaptation circuit 506 updating the model of the power amplifier 130 in the communication system 100/500 includes the adaptation circuit 506 computing updated filter coefficients to be used in applying the predistortion by the DPD actuator circuit 112. Thus, the DPD circuit 110 is configured to update filter coefficients which are used in applying the DPD based on the OOB error signal generated by the OOB regularization circuit 174, which effectively modifies the adaptation algorithm. In some embodiments, such modification to an adaptation may reside in software only, in contrast to some conventional solutions for decreasing OOB content described above, which rely on adding hardware in the form of LPFs at the output of each DPD term of the DPD actuator to explicitly filter out the OOB content from the output of the DPD actuator. As described above, adding these additional LPFs in conventional solutions is expensive both in terms of gate count (i.e., more transistors have to be implemented, taking up valuable space) and power consumption. On the other hand, the DPD circuit 110 described herein may be realized with a much smaller cost, compared to such conventional solutions, by implicitly shaping the DPD terms to have attenuation of OOB components by virtue of appropriately updating the model coefficients.

PE Regularization

Continuing with further details of the DPD circuit 110, functionality of performing DPD with PE regularization according to various embodiments of the present disclosure may be illustrated with reference to FIGS. 6-7.

Figure 6:
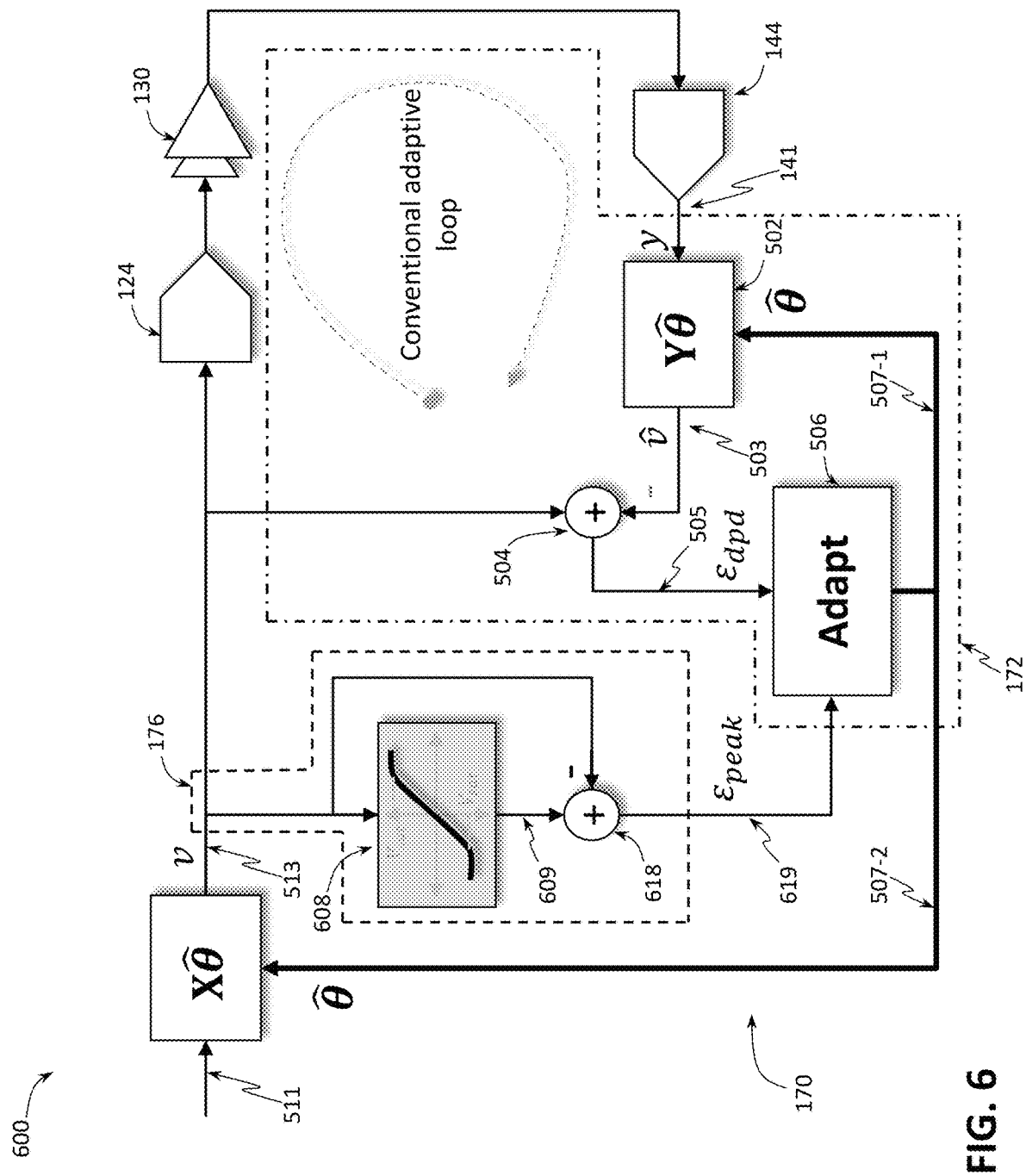
FIG. 6 illustrates a schematic block diagram of a portion of a communication system with a DPD circuit with PE regularization, according to some embodiments of the present disclosure.

FIG. 6 illustrates a schematic block diagram of a portion 600 of the communication system 100 shown in FIG. 1, with a DPD circuit with PE regularization, according to some embodiments of the present disclosure. FIG. 6 illustrates some elements with the same reference numerals as those used in FIG. 1 and FIG. 5 to indicate that these elements are the same or analogous as those described with reference to FIG. 1 and FIG. 5 so that, in the interests of brevity, their description is not repeated. In particular, FIG. 6 illustrates the DPD actuator 112, the DAC 124, the power amplifier 130, and the ADC 144. Other components of the transmitter 120 and the receiver 140 which were shown in FIG. 1 are not shown in FIG. 6 in order to not clutter the drawing because the illustration of FIG. 6 focuses on the example implementation of the adaptation circuit 172 (approximate functional boundaries of which are shown in FIG. 6 with a dash-dotted contour) and of the PE regularization circuit 176 (approximate functional boundaries of which are shown in FIG. 6 with a dashed contour). Furthermore, example implementation of the adaptation circuit 172 shown in FIG. 6 is the same as the one shown in FIG. 5 to indicate that the same adaptation circuit 172 may be used to cooperate with the PE regularization circuit 176 of FIG. 6 as the one that may be used to cooperate with the OOB regularization circuit 174 of FIG. 5. In fact, in some embodiments, the DPD circuit 110 may include both the OOB regularization circuit 174 and the PE regularization circuit 176, as described above. Therefore, descriptions of the adaptation circuit 172 provided above are not repeated here and only the differences are described.

As shown in FIG. 6, the PE regularization circuit 176 may include means for generating an error signal 619 ($\varepsilon_{peak}$, shown in FIG. 6), similar to the OOB error signal 509, described above, but now the error signal 619 being indicative of samples in the output 513 of the DPD actuator circuit 112 which have amplitude greater than a certain threshold. The adaptation circuit 506 may then be configured to update the model of the power amplifier 130 based on the DPD error signal 505 ($\varepsilon_{dpd}$) as well as based on the PE error signal 619 ($\varepsilon_{peak}$). The adaptation circuit 506 may update the model by updating the ($\varepsilon_{peak}$). coefficients to be applied by the DPD actuator 112 in a subsequent iteration and may provide updated coefficients $\hat{\theta}$ both to the adaptive postdistortion circuit 502 (as shown in FIG. 6 with the communication path 507-1) and to the DPD actuator circuit 112 (as shown in FIG. 6 with the communication path 507-2).

In some embodiments, the PE regularization circuit 176 may be implemented as shown in FIG. 6, where the PE regularization circuit 176 may include a clipping circuit 608 and an adder/subtractor 618. The clipping circuit 608 may be configured to receive the output 513 of the actuator circuit 112 and to use the received output 513 to generate a clipped output signal 609 in which the amplitude of the samples in the output 513 of the actuator circuit 112 which have the amplitude greater than the threshold. The adder/subtractor 618 may then receive, both, the output 513 of the actuator circuit 112 and the clipped output 609, and generate the PE error signal 619, e.g., as a difference between the output 513 and an output 609 (i.e., the output of the actuator circuit in which the clipping circuit 608 clipped the amplitude of the samples for those samples that had the amplitude greater than the threshold).

Figure 7:
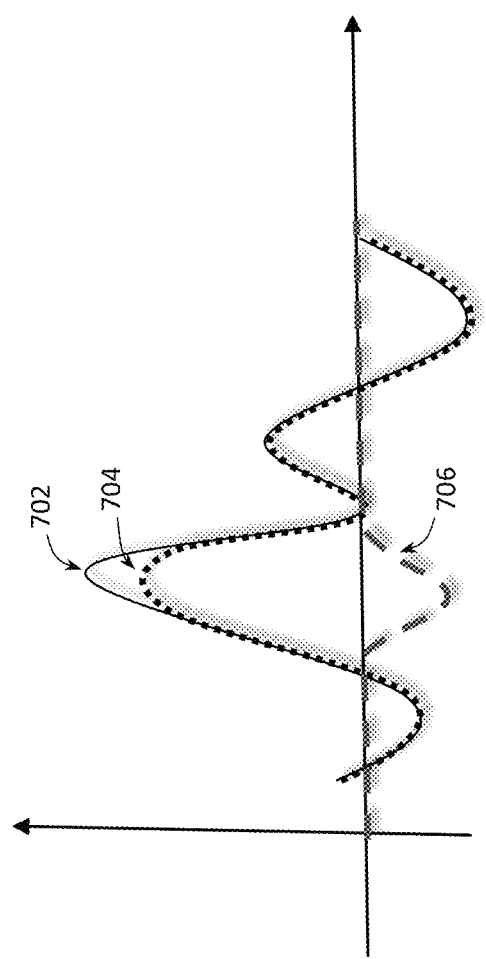
FIG. 7 illustrates example signals at various portions of a DPD circuit with PE regularization, according to some embodiments of the present disclosure.

FIG. 7 illustrates example signals at various portions of a DPD circuit with PE regularization, e.g., of the DPD circuit 110 as shown in FIG. 6, according to some embodiments of the present disclosure. In particular, a curve 702 shown in FIG. 7 illustrates an example output of the DPD actuator 112, e.g., the output 513, described above. A curve 704 shown in FIG. 7 illustrates an example output of the clipping circuit that clips amplitudes above a certain threshold, e.g., the output 609 of the clipping circuit 608, described above. A curve 706 shown in FIG. 7 illustrates an example output of the PE regularization circuit 176, e.g., the output 619 (i.e., the PE error signal), described above.

Other implementations of the PE regularization circuit 176 may be used and are within the scope of the present disclosure as long as the PE error signal 619 generated by the PE regularization circuit 176 is such that the more samples of the output 513 exceed the threshold, and by the greater amount, the larger is the power of the PE error signal 619. The PE error signal 619 may then be used by the adaptation circuit 506, in addition to the DPD error signal 505, to update the model and generate updated coefficients $\hat{\theta}$ to be provided to the feedback predistortion circuit 502 and to the DPD actuator circuit 112, to be used in subsequent iterations.

In some embodiments, the adaptation of the system 600 may function as follows. The model of the power amplifier 130 may include a loss term, or function, that is a multi-objective loss that includes a first term and a second term. The first term may be as that described above with reference to the OOB regularization. The second term may be indicative of how the output 513 of the actuator circuit 112 exceeds a certain threshold. For example, the first term may be indicative of (e.g., be based on) the DPD error signal 505, while the second term may be indicative of the PE error signal 619. At least one of the first term and the second term may be a mean squared value. For example, the loss function may be a multi-objective loss function defined as:

$$\mathcal{L}_{(\varepsilon_{dpd}, \varepsilon_{peak})} = E\{\varepsilon_{dpd}^2\} + \lambda_{peak} E\{\varepsilon_{peak}^2\}, \quad (3)$$

where the first term, $E\{\varepsilon_{dpd}^2\}$, may be indicative of the OLS DPD loss, and may be based on the mean squared value of the DPD error signal 505 ($\varepsilon_{dpd}$), while the second term, $E\{\varepsilon_{peak}^2\}$, may be indicative of the PE loss, and may be based on the mean squared value of the PE error signal 619 ($\varepsilon_{peak}$). In this equation, parameter $\lambda_{peak}$ may be a weight that defined how heavily the PE error signal is to be weighed in the loss function. In this way, by incorporating the second term into the loss function, the adaptation circuit 506 may be configured to penalize DPD solutions having content with high peaks, where the greater is the weight $\lambda_{peak}$, the heavier the penalty may be. The adaptation circuit 506 may then be configured to update the model based on the DPD error signal 505 and the PE error signal 619 with the goal of decreasing the loss function.

In some embodiments, the adaptation circuit 506 updating the model based on the PE error signal 619 to decrease the loss function may include the adaptation circuit implementing a Gauss-Newton algorithm to decrease the loss function, although, in other embodiments, other algorithms may be used.

In some embodiments, the coefficients may be updated based on the PE error signal 619 according to the following update equation:

$$\hat{\theta}_k = \hat{\theta}_{k-1} + \mu \{Y^H Y + \lambda Z^H Z\}^{-1} \{Y^H \varepsilon_{dpd} + \lambda Z^H \varepsilon_{peak}\}, \quad (4)$$

where Y is the negative gradient, (Jacobian) of $E\{\varepsilon_{dpd}^2\}$), Z is the negative gradient, (Jacobian) of $$E\{\varepsilon_{oob}^2\}, Z = X - X\frac{\partial z}{\partial v},$$

X DPD basis matrix.

When the input to the DPD actuator, x, is within the saturation limits, peak and gradient Z are going towards 0 and the solver is not penalized. Conversely, when the DPD actuator 112 produces high peaks, penalization and PE regularization increases to direct the adaptation circuit 506 towards another solution.

Example DPD Method Based on Generating an Error Signal

DPD with OOB and/or PE regularization as described above may be extended to a general approach of including a circuit, e.g., within the DPD circuit 110, e.g., within the coefficient generation circuit 170, that is configured to receive the output of the DPD actuator 112 and generate an error signal that would be indicative of any kind of undesired/offensive behavior in the output signal. The error signal may be such that the greater the undesired/offensive behavior, in terms of one or more suitable metrics, the larger the signal is (e.g., the larger the mean square value of the error signal is). Such an error signal may then be used by the adaptation circuit 172 to update the model and generate updated coefficients for one or more of the subsequent iterations.

Figure 8:
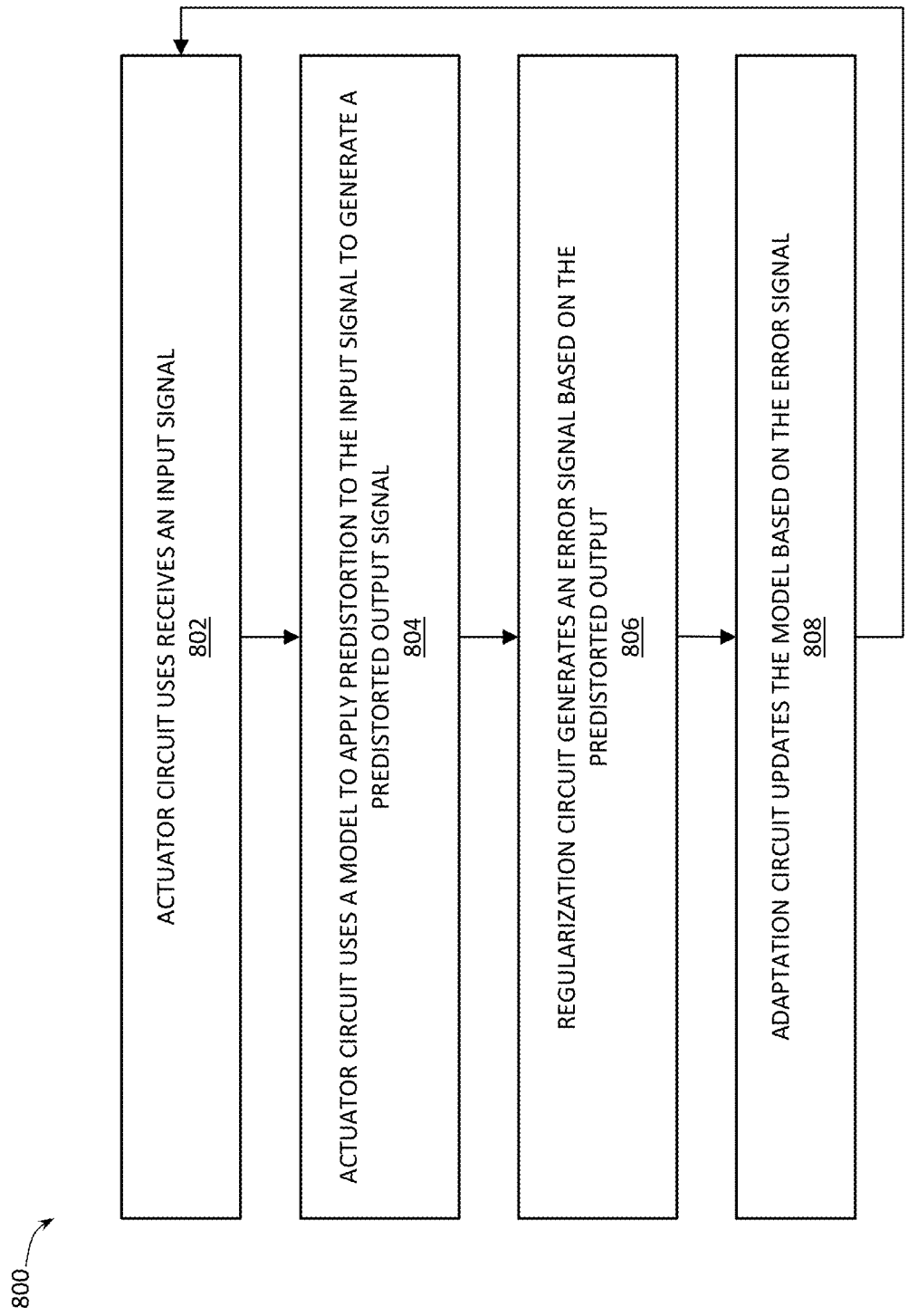
FIG. 8 provides a flow chart of a method for implementing DPD using an error signal, according to some embodiments of the present disclosure.

FIG. 8 provides a flow chart of a method 800 for implementing DPD using such an error signal, e.g., for implementing DPD with OOB and/or PE regularization as described above, according to some embodiments of the present disclosure. At least portions of the method 800 may be implemented by elements of a communication system according to any embodiments of the present disclosure, e.g., by the communication system described with reference to FIGS. 1, 5, and/or 6, and/or by one or more data processing systems, such as the data processing system 900 shown in FIG. 9. Although described with reference to system components of the systems shown in the present figures, any system, configured to perform operations of the method 800, in any order, is within the scope of the present disclosure. Furthermore, it should be noted that, while a differentiation is made, both in the illustration of the communication systems shown in FIGS. 1, 5, and 6, and in the illustration of the method 800 shown in FIG. 8, between a regularization circuit and an adaptation circuit, this differentiation may be only functional/logical, to merely differentiate functions that may be performed by a conventional DPD circuit and functions specifically related to DPD with OOB and/or PE regularization. In various embodiments, functionality of any of the regularization circuits described herein, e.g., the OOB regularization circuit 174, the PE regularization circuit 176, or any general regularization circuit, may be included, or be considered as a part of the adaptation circuit 172, or functionalities of these two circuits may be spread over a larger number of individual circuits.

The method 800 may begin with an operation 802 that includes the DPD actuator circuit 112 receiving an input signal, e.g., the signal 511, described above. In operation 804, the DPD actuator circuit 112 may use a model of the power amplifier 130 to apply predistortion to the input signal received in 802 to generate a predistorted output signal, e.g., the signal 513, described above. The method 800 may then proceed to an operation 806 that includes a regularization circuit receiving the predistorted output signal from the DPD actuator circuit 112 and generating an error signal based on the received signal. For example, 806 may include the OOB regularization circuit 174 generating the OOB error signal as described above, the PE regularization circuit 176 generating the PE error signal as described above, or any general regularization circuit generating an error signal indicative of some kind of offensive behavior other than generation of the OOB components or PE. The method 800 may further include an operation 808 in which the adaptation circuit 172 (e.g., the adaptation circuit 506, described above) uses the error signal generated in 806 to update the model and generate updated filter coefficients to be applied by the DPD actuator circuit 112 in one or more subsequent iterations of the method 800. To that end, 808 may include the adaptation circuit 172 updating the model not only based on the error signal generated in 806, but also using a DPD error signal that may be generated based on comparing a feedback signal indicative of the output of the power amplifier 130 and the predistorted output generated by the DPD circuit 112. In some embodiments, 808 may include the adaptation circuit 172 generating/evaluating a loss function in terms of the error signal generated in 806 and the DPD error signal and update the model in an attempt to minimize the loss function, as described above for the examples of the loss functions for OOB regularization and PE regularization. The method 800 may then proceed with the next iteration, now with the updated model coefficients, as shown in FIG. 8 with an arrow from 808 to 802.

Example Data Processing System

Figure 9:
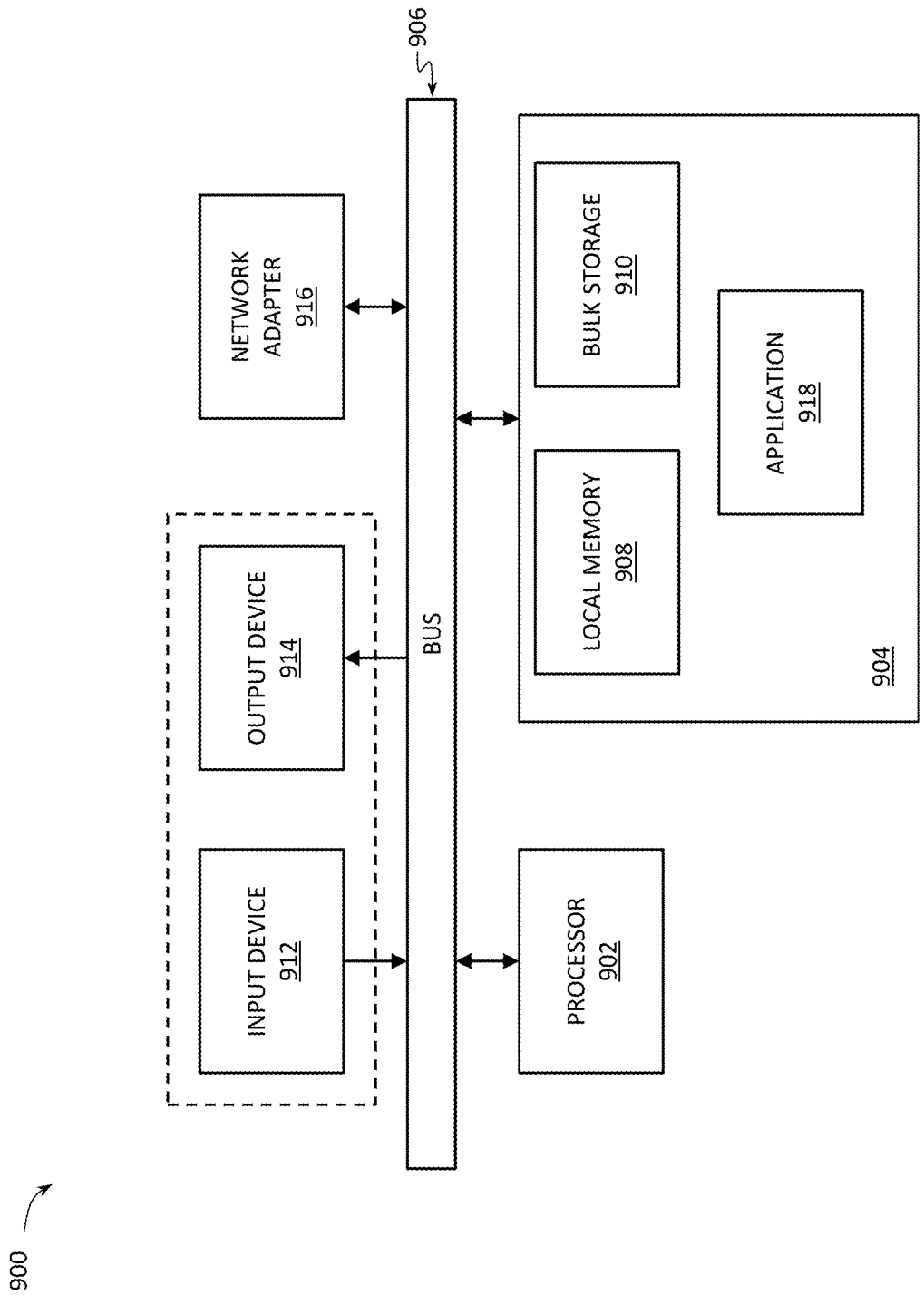
FIG. 9 provides a schematic block diagram of an example data processing system that may be configured to implement at least portions of DPD with OOB and/or PE regularization, according to some embodiments of the present disclosure.

FIG. 9 provides a schematic block diagram of an example data processing system 900 that may be configured to implement at least portions of DPD with OOB and/or PE regularization, or DPD using any error signal according to the method 800, according to some embodiments of the present disclosure. For example, the data processing system 900 may be used to implement at least portions of the communication system as described with reference to FIGS. 1, 5, and 6, in particular, to implement at least portions of the DPD circuit 110 as described herein.

As shown in FIG. 9, the data processing system 900 may include at least one processor 902, e.g. a hardware processor 902, coupled to memory elements 904 through a system bus 906. As such, the data processing system may store program code within memory elements 904. Further, the processor 902 may execute the program code accessed from the memory elements 904 via a system bus 906. In one aspect, the data processing system may be implemented as a computer that is suitable for storing and/or executing program code. It should be appreciated, however, that the data processing system 900 may be implemented in the form of any system including a processor and a memory that is capable of performing the functions described within this disclosure.

In some embodiments, the processor 902 can execute software or an algorithm to perform the activities as discussed in this specification, in particular activities related to DPD with OOB and/or PE regularization, or DPD using any error signal according to the method 800, such as various techniques implemented by the DPD circuit 110 described herein. The processor 902 may include any combination of hardware, software, or firmware providing programmable logic, including by way of non-limiting example a microprocessor, a DSP, a field-programmable gate array (FPGA), a programmable logic array (PLA), an integrated circuit (IC), an application specific IC (ASIC), or a virtual machine processor. The processor 902 may be communicatively coupled to the memory element 904, for example in a direct-memory access (DMA) configuration, so that the processor 902 may read from or write to the memory elements 904.

In general, the memory elements 904 may include any suitable volatile or non-volatile memory technology, including double data rate (DDR) random access memory (RAM), synchronous RAM (SRAM), dynamic RAM (DRAM), flash, read-only memory (ROM), optical media, virtual memory regions, magnetic or tape memory, or any other suitable technology. Unless specified otherwise, any of the memory elements discussed herein should be construed as being encompassed within the broad term "memory." The information being measured, processed, tracked or sent to or from any of the components of the data processing system 900 could be provided in any database, register, control list, cache, or storage structure, all of which can be referenced at any suitable timeframe. Any such storage options may be included within the broad term "memory" as used herein. Similarly, any of the potential processing elements, modules, and machines described herein should be construed as being encompassed within the broad term "processor." Each of the elements shown in the present figures, e.g., any of the circuits/components shown in FIGS. 1, 5, and 6, can also include suitable interfaces for receiving, transmitting, and/or otherwise communicating data or information in a network environment so that they can communicate with, e.g., the data processing system 900 of another one of these elements.

In certain example implementations, mechanisms for implementing DPD with OOB and/or PE regularization, or DPD using any error signal according to the method 800, in communication systems as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. the memory elements 904 shown in FIG. 9, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. the processor 902 shown in FIG. 9, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, a DSP, an erasable programmable read-only memory (EPROM), an electrically erasable programmable read-only memory (EEPROM)) or an ASIC that includes digital logic, software, code, electronic instructions, or any suitable combination thereof.

The memory elements 904 may include one or more physical memory devices such as, for example, local memory 908 and one or more bulk storage devices 910. The local memory may refer to RAM or other non-persistent memory device(s) generally used during actual execution of the program code. A bulk storage device may be implemented as a hard drive or other persistent data storage device. The processing system 900 may also include one or more cache memories (not shown) that provide temporary storage of at least some program code in order to reduce the number of times program code must be retrieved from the bulk storage device 910 during execution.

As shown in FIG. 9, the memory elements 904 may store an application 918. In various embodiments, the application 918 may be stored in the local memory 908, the one or more bulk storage devices 910, or apart from the local memory and the bulk storage devices. It should be appreciated that the data processing system 900 may further execute an operating system (not shown in FIG. 9) that can facilitate execution of the application 918. The application 918, being implemented in the form of executable program code, can be executed by the data processing system 900, e.g., by the processor 902. Responsive to executing the application, the data processing system 900 may be configured to perform one or more operations or method steps described herein.

Input/output (I/O) devices depicted as an input device 912 and an output device 914, optionally, can be coupled to the data processing system. Examples of input devices may include, but are not limited to, a keyboard, a pointing device such as a mouse, or the like. Examples of output devices may include, but are not limited to, a monitor or a display, speakers, or the like. In some embodiments, the output device 914 may be any type of screen display, such as plasma display, liquid crystal display (LCD), organic light emitting diode (OLED) display, electroluminescent (EL) display, or any other indicator, such as a dial, barometer, or light emitting diode (LED). In some implementations, the system may include a driver (not shown) for the output device 914. Input and/or output devices 912, 914 may be coupled to the data processing system either directly or through intervening I/O controllers.

In an embodiment, the input and the output devices may be implemented as a combined input/output device (illustrated in FIG. 9 with a dashed line surrounding the input device 912 and the output device 914). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 916 may also, optionally, be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 900, and a data transmitter for transmitting data from the data processing system 900 to said systems, devices and/or networks. Modems, cable modems, and Ethernet cards are examples of different types of network adapter that may be used with the data processing system 900.

Select Examples

Example 1 provides an apparatus for applying digital predistortion to an input signal. The apparatus includes an actuator circuit, an adaptation circuit, and an OOB regularization circuit. The actuator circuit is configured to use a model of a nonlinear electronic component to apply a predistortion to at least a portion of an input signal to generate an output of the actuator circuit (i.e., to predistort the input signal prior to providing it to the nonlinear electronic component), the input signal including a range of in-band (i.e., desired/target) frequency components. The adaptation circuit is configured to update the model based on one or more captures of a feedback signal indicative of (e.g., including, or being based on) an output of the nonlinear electronic component, where capture includes L consecutive samples of the feedback signal, where L is an integer equal to or greater than 2. The OOB regularization circuit is configured to receive the output of the actuator circuit (where the output of the actuator circuit is the input signal to which the actuator circuit applied the predistortion), and generate an OOB error signal ($\varepsilon_{oob}$) indicative of OOB (i.e., undesired) frequency components that might be present in the output of the actuator circuit and provide the OOB error signal to the adaptation circuit. In turn, the adaptation circuit is configured to update the model further based on the OOB error signal.

Example 2 provides the apparatus according to example 1, where the OOB regularization circuit includes a filter configured to filter the output of the actuator circuit to generate the OOB error signal as a filtered output of the actuator circuit in which the in-band frequency components are attenuated (e.g., reduced or eliminated) and the OOB frequency components are passed (e.g., maintained as they were without applying any attenuation or amplification), amplified (e.g., gained in their magnitude), or attenuated by a smaller factor than that applied to attenuate the in-band frequency components. It might be suitable, in some implementations, to provide such a filter so that it would simply pass the OOB components, without any attenuation or amplification (i.e., the factor by which the amplitude of these components is adjusted is substantially 1.0). In case the filter is such that it gains the OOB components (i.e., increases their amplitude), the factor by which the amplitude of these components is adjusted may be between about 1.0 and 2.0, including all values and ranges therein, e.g., between about 1.0 and 1.5, or between about 1.0. and 1.2. In case the filter is such that it attenuates the OOB components (i.e., decreases their amplitude), the factor by which the amplitude of these components is adjusted may be between about 0.5 and 1.0, including all values and ranges therein, e.g., between about 0.7 and 1.0, or between about 0.9 and 1.0. This may be in contrast to the attenuation factor applied by the filter to attenuate the in-band components, where the attenuation factor may be between about 0 and 0.5, or between 0 and 0.2.

Example 3 provides the apparatus according to example 2, where the filter is a high-pass filter.

Example 4 provides the apparatus according to any one of the preceding examples, where the model includes a loss term that is based on a first term and a second term, the first term is indicative of a difference between the feedback signal (i.e., the output of the nonlinear component) and the output of the actuator circuit, and the second term is indicative of an amount and/or a magnitude of the OOB frequency components present in the output of the actuator circuit. In general, the second term may be a term that provides some measure of the DPD output that falls out of band, such as the power or mean square value.

Example 5 provides the apparatus according to example 4, where at least one of the first term and the second term is a mean squared value.

Example 6 provides the apparatus according to examples 4 or 5, where the adaptation circuit updating the model includes the adaptation circuit updating the model to decrease the loss function.

Example 7 provides the apparatus according to example 6, where the adaptation circuit updating the model to decrease the loss function includes the adaptation circuit implementing a Gauss-Newton algorithm to decrease the loss function. In other embodiments, other algorithms may be used to decrease the loss function.

Example 8 provides the apparatus according to any one of the preceding examples, where the adaptation circuit updating the model includes the adaptation circuit computing updated filter coefficients to be used in applying the predistortion.

Example 9 provides the apparatus according to any one of the preceding examples, where the adaptation circuit is configured to update the model further based on a DPD error signal ($\epsilon_{dpd}$) indicative of a difference between the output of the actuator circuit (i.e., a signal which may not only include the in-band frequency components but also the OOB frequency components) and the feedback signal (i.e., the output of the nonlinear component).

Example 10 provides the apparatus according to any one of the preceding examples, further including a PE regularization circuit configured to receive the output of the actuator circuit (where the output of the actuator circuit is the input signal to which the actuator circuit applied the predistortion), and generate a PE error signal ($\varepsilon_{peak}$) indicative of samples that might be present in the output of the actuator circuit which have amplitude greater than a threshold, and provide the PE error signal to the adaptation circuit, where the adaptation circuit is configured to update the model further based on the PE error signal.

In various further embodiments according to example 10, the PE regularization circuit and the adaptation circuit may be configured according to any one of examples 11-18.

Example 11 provides an apparatus for applying digital predistortion to an input signal. The apparatus includes an actuator circuit, an adaptation circuit, and a PE regularization circuit. The actuator circuit is configured to use a model of a nonlinear electronic component to apply a predistortion to at least a portion of an input signal prior to generate an output of the actuator circuit (i.e., to predistort the input signal prior to providing it to the nonlinear electronic component). The adaptation circuit is configured to update the model based on one or more captures of a feedback signal indicative of (e.g., including, or being based on) an output of the nonlinear electronic component, where capture includes L consecutive samples of the feedback signal, where L is an integer equal to or greater than 2. The PE regularization circuit is configured to receive the output of the actuator circuit (where the output of the actuator circuit is the input signal to which the actuator circuit applied the predistortion), and generate a PE error signal ($\varepsilon_{peak}$) indicative of samples that might be present in the output of the actuator circuit which have an amplitude greater than a threshold, and provide the PE error signal to the adaptation circuit, where the adaptation circuit is configured to update the model further based on the PE error signal.

Example 12 provides the apparatus according to example 11, where the PE regularization circuit includes a clipping circuit configured to clip the amplitude of the samples in the output of the actuator circuit which have the amplitude greater than the threshold.

Example 13 provides the apparatus according to example 12, where the PE regularization circuit is configured to generate the PE error signal based on a difference between the output of the actuator circuit and an output of the clipping circuit (i.e., the output of the actuator circuit in which the clipping circuit clipped the amplitude of the samples for those samples that had the amplitude greater than the threshold).

Example 14 provides the apparatus according to any one of examples 11-13, where the adaptation circuit is configured to update the model further based on a DPD error signal ($\varepsilon$dpd) indicative of a difference between the output of the actuator circuit (i.e., a signal which may have samples having amplitude greater than the threshold) and the feedback signal (i.e., the output of the nonlinear component).

Example 15 provides the apparatus according to any one of examples 11-14, where the model includes a loss term that is based on a first term and a second term, the first term is based on a DPD error signal ($\varepsilon dpd$) indicative of a difference between the output of the actuator circuit (i.e., a signal which may have samples having amplitude greater than the threshold) and the feedback signal (i.e., the output of the nonlinear component), the second term is based on the PE error signal, and the adaptation circuit updating the model includes the adaptation circuit updating the model to decrease the loss function. In general, the second term may be a term that provides some measure of the DPD output that has peak expansion, such as the power or mean square value for samples that had amplitude greater than a certain threshold.

Example 16 provides the apparatus according to example 15, where at least one of the first term and the second term is a mean squared value.

Example 17 provides the apparatus according to examples 15 or 16, where the adaptation circuit updating the model to decrease the loss function includes the adaptation circuit implementing a Gauss-Newton algorithm to decrease the loss function. In other embodiments, other algorithms may be used to decrease the loss function.

Example 18 provides the apparatus according to any one of examples 11-17, where the adaptation circuit updating the model includes the adaptation circuit computing updated filter coefficients to be used in applying the predistortion.

Example 19 provides an apparatus for applying digital predistortion to an input signal. The apparatus includes an actuator circuit, an error correction circuit, and an adaptation circuit. The actuator circuit is configured to use a model of a nonlinear electronic component to apply a predistortion to at least a portion of an input signal to generate an output of the actuator circuit (i.e., to predistort the input signal prior to providing it to the nonlinear electronic component). The error correction circuit is configured to receive the output of the actuator circuit (where the output of the actuator circuit is the input signal to which the actuator circuit applied the predistortion), and generate an error signal (e.g., $\varepsilon_{oob}$ or $\varepsilon_{peak}$) or indicative of a deviation of the output of the actuator circuit from a target/desired output. The adaptation circuit is configured to update the model based on one or more captures of a feedback signal indicative of (e.g., including, or being based on) an output of the nonlinear electronic component, where capture includes L consecutive samples of the feedback signal, where L is an integer equal to or greater than 2, and further based on the error signal.

Example 20 provides the apparatus according to example 19, where the model includes a loss term that is based on a first term and a second term, the first term is based on a DPD error signal ($\varepsilon_{dpd}$) indicative of a difference between the output of the actuator circuit (i.e., a signal which may exhibit some undesirable behavior, e.g., a signal which may have samples having amplitude greater than the threshold, or a signal which may have frequency components outside of the desired frequency band) and the feedback signal (i.e., the output of the nonlinear component), the second term is based on the error signal, and the adaptation circuit updating the model includes the adaptation circuit updating the model to decrease the loss function.

Example 21 provides the apparatus according to example 20, where at least one of the first term and the second term is weighted in the loss term according to a weighting parameter.

Example 22 provides the apparatus according to examples 20 or 21, where at least one of the first term and the second term is a mean squared value.

Example 23 provides the apparatus according to any one of examples 20-22, where the adaptation circuit updating the model to decrease the loss function includes the adaptation circuit implementing a Gauss-Newton algorithm to decrease the loss function. In other embodiments, other algorithms may be used to decrease the loss function.

Example 24 provides the apparatus according to any one of examples 19-23, where the adaptation circuit is configured to update the model further based on a DPD error signal ($\varepsilon_{dpd}$) indicative of a difference between the output of the actuator circuit (i.e., a signal which may exhibit some undesirable behavior) and the feedback signal (i.e., the output of the nonlinear component).

Example 25 provides the apparatus according to any one of examples 19-24, where the adaptation circuit updating the model includes the adaptation circuit computing updated filter coefficients to be used in applying the predistortion.

Example 26 provides the apparatus according to any one of the preceding examples, where the nonlinear electronic component is a power amplifier.

Example 27 provides a computer-implemented method of digital predistortion, the method including an actuator circuit using a model of a nonlinear electronic component to apply a predistortion to at least a portion of an input signal to generate a predistorted output (i.e., to predistort the input signal prior to providing it to the nonlinear electronic component); an error correction circuit generating an error signal (e.g., $\varepsilon_{oob}$ or $\varepsilon_{peak}$) indicative of a deviation of the predistorted output from a target/desired output; and an adaptation circuit updating the model based on one or more captures of a feedback signal indicative of (e.g., including, or being based on) an output of the nonlinear electronic component, where capture includes L consecutive samples of the feedback signal, where L is an integer equal to or greater than 2, and further based on the error signal.

Example 28 provides the method according to example 27, where the input signal includes a range of in-band (i.e., desired/target) frequency components, and the error signal is indicative of OOB (i.e., undesired) frequency components that might be present in the predistorted output.

Example 29 provides the method according to example 27, where the error signal is indicative of samples, which might be present in the predistorted output, which have amplitude greater than a threshold.

Example 30 provides the method according to any one of examples 27-29, further including the adaptation circuit generating a DPD error signal ($\varepsilon_{dpd}$) indicative of a difference between the predistorted output and the feedback signal, where the adaptation circuit updating the model based on the feedback signal includes the adaptation circuit updating the model based on the DPD error signal.

Example 31 provides the method according to example 30, where the model includes a loss term that is based on a first term and a second term, the first term is based on the DPD error signal, the second term is based on the error signal, and the adaptation circuit updating the model includes the adaptation circuit updating the model to decrease the loss function.

Example 32 provides the method according to example 31, where at least one of the first term and the second term is a mean squared value.

Example 33 provides the method according to examples 31 or 32, where the adaptation circuit updating the model to decrease the loss function includes the adaptation circuit implementing a Gauss-Newton algorithm to decrease the loss function. In other embodiments, other algorithms may be used to decrease the loss function.

Example 34 provides the method according to any one of examples 27-33, where the adaptation circuit updating the model includes the adaptation circuit computing updated filter coefficients to be used in applying the predistortion.

Example 35 provides the method according to any one of examples 27-34, where the nonlinear electronic component is a power amplifier.

Example 36 provides a non-transitory computer-readable storage medium including instructions for execution which, when executed by a processor, are operable to perform operations of a method according to any one of the preceding examples (e.g., the method according to any one of examples 27-35), and/or operations to enable performing DPD in an apparatus according to any one of the preceding examples (e.g., the apparatus according to any one of examples 1-26). Thus, in some examples, the non-transitory computer-readable storage medium according to example 36 may further include instructions operable to perform operations performed by any parts of the communication system in accordance with any one of the preceding examples.

Variations and Implementations

While embodiments of the present disclosure were described above with references to exemplary implementations as shown in FIGS. 1-9, a person skilled in the art will realize that the various teachings described above are applicable to a large variety of other implementations.

In certain contexts, the features discussed herein can be applicable to automotive systems, safety-critical industrial applications, medical systems, scientific instrumentation, wireless and wired communications, radio, radar, industrial process control, audio and video equipment, current sensing, instrumentation (which can be highly precise), and other digital-processing-based systems.

In the discussions of the embodiments above, components of a system, such as filters, converters, mixers, and/or other components can readily be replaced, substituted, or otherwise modified in order to accommodate particular circuitry needs. Moreover, it should be noted that the use of complementary electronic devices, hardware, software, etc., offer an equally viable option for implementing the teachings of the present disclosure related to DPD with OOB and/or PE regularization, or DPD using any error signal based on the output of a DPD actuator circuit, in various communication systems.

Parts of various systems for implementing DPD with OOB and/or PE regularization, or DPD using any error signal based on the output of a DPD actuator circuit, as proposed herein can include electronic circuitry to perform the functions described herein. In some cases, one or more parts of the system can be provided by a processor specially configured for carrying out the functions described herein. For instance, the processor may include one or more application specific components, or may include programmable logic gates which are configured to carry out the functions describe herein. The circuitry can operate in analog domain, digital domain, or in a mixed-signal domain. In some instances, the processor may be configured to carrying out the functions described herein by executing one or more instructions stored on a non-transitory computer-readable storage medium.

In one example embodiment, any number of electrical circuits of the present figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of DSPs, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

In another example embodiment, the electrical circuits of the present figures may be implemented as stand-alone modules (e.g., a device with associated components and circuitry configured to perform a specific application or function) or implemented as plug-in modules into application specific hardware of electronic devices. Note that particular embodiments of the present disclosure may be readily included in a system on chip (SOC) package, either in part, or in whole. An SOC represents an IC that integrates components of a computer or other electronic system into a single chip. It may contain digital, analog, mixed-signal, and often RF functions: all of which may be provided on a single chip substrate. Other embodiments may include a multi-chip-module (MCM), with a plurality of separate ICs located within a single electronic package and configured to interact closely with each other through the electronic package.

It is also imperative to note that all of the specifications, dimensions, and relationships outlined herein (e.g., the number of components of the communication system shown in FIGS. 1, 5, and 6) have only been offered for purposes of example and teaching only. Such information may be varied considerably without departing from the spirit of the present disclosure, or the scope of the appended claims. It should be appreciated that the system can be consolidated in any suitable manner. Along similar design alternatives, any of the illustrated circuits, components, modules, and elements of the present figures may be combined in various possible configurations, all of which are clearly within the broad scope of this specification. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than in a restrictive sense.

It is also important to note that the functions related to DPD with OOB and/or PE regularization, or DPD using any error signal based on the output of a DPD actuator circuit, as proposed herein illustrate only some of the possible functions that may be executed by, or within, communication systems. Some of these operations may be deleted or removed where appropriate, or these operations may be modified or changed considerably without departing from the scope of the present disclosure. Substantial flexibility is provided by embodiments described herein in that any suitable arrangements, chronologies, configurations, and timing mechanisms may be provided without departing from the teachings of the present disclosure.

The invention claimed is:

1. An apparatus for applying digital predistortion to an input signal, the apparatus comprising:
    an actuator circuit, configured to use a model of a nonlinear electronic component to apply a predistortion to at least a portion of an input signal to generate an output of the actuator circuit, the input signal comprising a range of in-band frequency components;
    an adaptation circuit, configured to update the model based on a feedback signal indicative of an output of the nonlinear electronic component; and
    an out-of-band (OOB) regularization circuit, configured to:
        receive the output of the actuator circuit, and
        generate an OOB error signal indicative of OOB frequency components in the output of the actuator circuit,
    wherein:
    the model includes a loss function that is indicative of a sum of a first term and a second term,
    the first term is indicative of a difference between the feedback signal and the output of the actuator circuit,
    the second term is indicative of the OOB error signal, and
    the adaptation circuit is configured to update the model further based on the OOB error signal in a way that decreases the loss function.

2. The apparatus according to claim 1, wherein the OOB regularization circuit includes an OOB filter configured to filter the output of the actuator circuit to be provided to the nonlinear electronic component to generate the OOB error signal as a filtered output of the actuator circuit in which the in-band frequency components are attenuated and the OOB frequency components are passed, amplified, or attenuated by a smaller factor than that applied to attenuate the in-band frequency components.

3. The apparatus according to claim 2, wherein the OOB filter is a high-pass filter.

4. The apparatus according to claim 2, wherein:
    a sequence of the actuator circuit, the nonlinear electronic component, and the adaptation circuit forms a first loop in that:
        a signal indicative of the output of the actuator circuit is an input for the nonlinear electronic component,
        the output of the nonlinear electronic component is based on the input for the nonlinear electronic component and a signal indicative of the output of the nonlinear electronic component is a first input for the adaptation circuit, and
        an output of the adaptation circuit is based on the first input for the adaptation circuit and a signal indicative of the output of the adaptation circuit is an input for the actuator circuit, and
    a sequence of the actuator circuit, the OOB filter, and the adaptation circuit forms a second loop in that:
        the signal indicative of the output of the actuator circuit is an input for the OOB filter,
        an output of the OOB filter is the OOB error signal that is based on the input for the OOB filter and a signal indicative of the output of the OOB filter is a second input for the adaptation circuit, and
        the output of the adaptation circuit is further based on the second input for the adaptation circuit.

5. The apparatus according to claim 1, wherein at least one of the first term and the second term is a mean squared value.

6. The apparatus according to claim 1, wherein the adaptation circuit updating the model includes the adaptation circuit computing updated coefficients of the model and providing the updated coefficients to the actuator circuit for a next iteration of the actuator circuit using the model to apply the predistortion.

7. The apparatus according to claim 1, wherein the adaptation circuit updating the model in the way that decreases the loss function includes the adaptation circuit implementing a Gauss-Newton algorithm to decrease the loss function.

8. The apparatus according to claim 1, further comprising a peak expansion (PE) regularization circuit configured to:
    receive the output of the actuator circuit, and
    generate a PE error signal indicative of samples in the output of the actuator circuit which have an amplitude greater than a threshold,
    wherein the adaptation circuit is configured to update the model further based on the PE error signal.

9. The apparatus according to claim 8, wherein:
    the PE regularization circuit includes a clipping circuit configured to generate an output by clipping the amplitude of the samples in the output of the actuator circuit which have the amplitude greater than the threshold, and
    the PE regularization circuit is configured to generate the PE error signal based on a difference between the output of the actuator circuit and the output of the clipping circuit.

10. The apparatus according to claim 9, wherein the loss function is further indicative of a sum of the first term, the second term, and a third term, where the third term is indicative of the PE error signal.

11. The apparatus according to claim 1, wherein the adaptation circuit is further configured to update the model in a way that decreases the OOB frequency components in the output of the actuator circuit.

12. The apparatus according to claim 1, wherein at least one of the first term and the second term is weighted in the loss function according to a weighting parameter.

13. The apparatus according to claim 1, wherein:
    the first term is indicative of the difference between the feedback signal and the output of the actuator circuit by being based on the mean squared value of the difference between the feedback signal and the output of the actuator circuit, and
    the second term is indicative of the OOB error signal by being based on the mean squared value of the OOB error signal.

14. The apparatus according to claim 13, wherein the second term is indicative of the OOB error signal by being based on the mean squared value of the OOB error signal multiplied by a weight that defines how heavily the OOB error signal is to be weighed in the loss function.

15. An apparatus for applying digital predistortion to an input signal, the apparatus comprising:
    an actuator circuit, configured to use a model of a nonlinear electronic component to apply digital predistortion to at least a portion of the input signal to generate an output of the actuator circuit, where the input signal includes signal components in an in-band range of frequencies, and where the output of the actuator circuit includes signal components in the in-band range of frequencies and signal components in an out-of-band (OOB) range of frequencies, the OOB range of frequencies being different from the in-band range of frequencies;

an OOB filter, configured to filter the output of the actuator circuit to be provided to the nonlinear electronic component to generate a filtered output of the actuator circuit in which the signal components of the output of the actuator circuit in the in-band range of frequencies are attenuated by a first factor and the signal components of the output of the actuator circuit in the OOB range of frequencies are passed or amplified or attenuated by a second factor such that a signal attenuated by the second factor is attenuated less than the signal attenuated by the first factor; and an adaptation circuit, configured to:
receive a first error signal, indicative of a difference between an output of the nonlinear electronic component and the output of the actuator circuit,
receive a second error signal, indicative of the filtered output of the actuator circuit,
use the first error signal and the second error signal to generate updated coefficients for the model, and
provide the updated coefficients to the actuator circuit for a next iteration of the actuator circuit using the model to generate the output of the actuator circuit.

16. The apparatus according to claim 15, wherein using the first error signal and the second error signal to generate the updated coefficients includes:
computing a value of a loss function that is indicative of a sum of a first term and a second term, where the first term is based on the first error signal and the second term is based on the second error signal, and
generating the updated coefficients as coefficients that result in a decreased value of the loss function for the next iteration of the actuator circuit using the model to generate the output of the actuator circuit.

17. The apparatus according to claim 16, wherein the loss function is such that the second term is multiplied by a weight that defines how heavily the OOB error signal is to be weighed in the loss function.

18. An apparatus for applying digital predistortion to an input signal, the apparatus comprising:
an actuator circuit, configured to use a model of a nonlinear electronic component to apply digital predistortion to at least a portion of the input signal to generate an output of the actuator circuit, where the input signal includes signal components in an in-band range of frequencies, and where the output of the actuator circuit includes signal components in the in-band range of frequencies and signal components in an out-of-band (OOB) range of frequencies, the OOB range of frequencies being different from the in-band range of frequencies;
an OOB filter, configured to filter the output of the actuator circuit to be provided to the nonlinear electronic component to generate a filtered output of the actuator circuit in which the signal components of the output of the actuator circuit in the in-band range of frequencies are attenuated by a first factor and the signal components of the output of the actuator circuit in the OOB range of frequencies are passed or amplified or attenuated by a second factor such that a signal attenuated by the second factor is attenuated less than the signal attenuated by the first factor; and
an adaptation circuit, configured to generate, based on a first input and a second input, update of one or more parameters of the model to be used by the actuator circuit for a next iteration of the actuator circuit using the model to generate the output of the actuator circuit,
wherein a sequence of the actuator circuit, the nonlinear electronic component, and the adaptation circuit forms a first loop in that:
a signal indicative of the output of the actuator circuit is an input for the nonlinear electronic component,
the output of the nonlinear electronic component is based on the input for the nonlinear electronic component and a signal indicative of the output of the nonlinear electronic component is the first input for the adaptation circuit, and
an output of the adaptation circuit is based on the first input for the adaptation circuit, is indicative of the update of the one or more parameters of the model, and a signal indicative of the output of the adaptation circuit is an input for the actuator circuit, and
wherein a sequence of the actuator circuit, the OOB filter, and the adaptation circuit forms a second loop in that:
the signal indicative of the output of the actuator circuit is an input for the OOB filter,
an output of the OOB filter is the filtered output of the actuator circuit that is based on the input for the OOB filter and a signal indicative of the output of the OOB filter is the second input for the adaptation circuit, and
the output of the adaptation circuit is further based on the second input for the adaptation circuit.

19. The apparatus according to claim 18, further comprising a peak expansion (PE) regularization circuit, configured to:
receive the output of the actuator circuit, and
generate a PE error signal indicative of samples in the output of the actuator circuit which have an amplitude greater than a threshold,
wherein the adaptation circuit is configured to generate the update of the one or more parameters further based on a third input, the third input indicative of the PE error signal.

20. The apparatus according to claim 18, wherein:
the apparatus further includes a clipping circuit configured to generate an output by clipping an amplitude of samples in the output of the actuator circuit if the amplitude is greater than a threshold,
the adaptation circuit is configured to generate the update of the one or more parameters of the model based on a third input, the third input being indicative of a difference between the output of the actuator circuit and the output of the clipping circuit.

* * * * *